US012748284B2

(12) United States Patent
Lee

(10) Patent No.: US 12,748,284 B2
(45) Date of Patent: Sep. 29, 2026

(54) IMAGING LENS SYSTEM

(71) Applicant: Samsung Electro-Mechanics Co., Ltd., Suwon-si (KR)

(72) Inventor: Da Ye Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 709 days.

(21) Appl. No.: 17/718,625

(22) Filed: Apr. 12, 2022

(65) Prior Publication Data

US 2023/0176334 A1 Jun. 8, 2023

(30) Foreign Application Priority Data

Dec. 7, 2021 (KR) ........................ 10-2021-0173554

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC . G02B 3/02; G02B 5/208; G02B 9/64; G02B 13/0015; G02B 13/0045; G02B 13/06; G02B 13/18; G02B 15/1461; G02B 15/1465; G02B 2003/0093; G02B 27/0012; G02B 27/0025; G03B 30/00; H04N 5/222; H04N 23/55
USPC ......... 359/207.2, 207.3, 350, 357, 642, 657, 359/671, 682, 708, 728, 751, 755
See application file for complete search history.

(56) References Cited

U.S. PATENT DOCUMENTS

| | | | |
|---|---|---|---|
| 10,466,445 | B2 | 11/2019 | Lian et al. |
| 2017/0235110 | A1 | 8/2017 | Chen |
| 2018/0120544 | A1 | 5/2018 | Chiang et al. |
| 2018/0172963 | A1 | 6/2018 | Kim et al. |
| 2018/0231748 | A1 | 8/2018 | Chang et al. |
| 2019/0204553 | A1 | 7/2019 | Lian et al. |

(Continued)

FOREIGN PATENT DOCUMENTS

| | | |
|---|---|---|
| CN | 106990510 A | 7/2017 |
| CN | 107065141 A | 8/2017 |

(Continued)

OTHER PUBLICATIONS

English translation of TW-201816461-A from Google Patents (Year: 2018).*

(Continued)

*Primary Examiner* — Stephone B Allen
*Assistant Examiner* — Daniel J. Jordan
(74) *Attorney, Agent, or Firm* — NSIP Law

(57) ABSTRACT

An imaging lens system includes a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system. The second lens has a concave object-side surface in a paraxial region thereof. The imaging lens system satisfies $f5/f6 < -1.0$, $f1/f4 < -2.4$, and $190° \leq HFOV$, where f is a focal length of the imaging lens system, f1 is a focal length of the first lens, f4 is a focal length of the fourth lens, f5 is a focal length of the fifth lens, and HFOV is a horizontal field of view of the imaging lens system.

14 Claims, 20 Drawing Sheets

(56) References Cited

U.S. PATENT DOCUMENTS

| | | | |
|---|---|---|---|
| 2019/0278055 A1 | 9/2019 | Lin et al. | |
| 2019/0324232 A1 | 10/2019 | Yang et al. | |
| 2019/0346662 A1* | 11/2019 | Kim | G02B 9/64 |
| 2019/0369359 A1 | 12/2019 | Son et al. | |
| 2021/0072509 A1 | 3/2021 | Chae et al. | |
| 2021/0173182 A1 | 6/2021 | Dai et al. | |
| 2021/0191087 A1 | 6/2021 | Komiyama et al. | |
| 2021/0231925 A1 | 7/2021 | You et al. | |
| 2022/0342186 A1 | 10/2022 | Wenren et al. | |

FOREIGN PATENT DOCUMENTS

| | | | | | |
|---|---|---|---|---|---|
| CN | 108873255 A | | 11/2018 | |
| CN | 112558270 A | | 3/2021 | |
| CN | 112711127 A | | 4/2021 | |
| CN | 112817132 A | * | 5/2021 | G02B 1/00 |
| CN | 113126255 A | | 7/2021 | |
| CN | 214375525 U | * | 10/2021 | B60R 11/04 |
| CN | 113687497 A | | 11/2021 | |
| KR | 10-2018-0069466 A | | 6/2018 | |
| KR | 10-2018-0070870 A | | 6/2018 | |
| TW | 201816461 A | * | 5/2018 | G02B 13/0045 |
| TW | M575119 U | | 3/2019 | |
| TW | 201939094 A | | 10/2019 | |
| TW | 201945783 A | | 12/2019 | |
| TW | 202122853 A | | 6/2021 | |
| TW | 202141113 A | | 11/2021 | |

OTHER PUBLICATIONS

Translation of Bao et al. (CN 112817132 A) (Year: 2021).*

Translation of Cai et al. (CN 214375525 U) (Year: 2021).*

Korean Office Action issued on Apr. 19, 2024, in counterpart Korean Patent Application No. 10-2021-0173554 (5 pages in English, 4 pages in Korean).

Taiwanese Office Action issued on Jan. 10, 2024, in counterpart Taiwanese Patent Application No. 112133918 (9 pages in English, 7 pages in Chinese).

Chinese Office Action issued on Mar. 19, 2024, in counterpart Chinese Patent Application No. 202210733796.6 (4 pages in English, 8 pages in Chinese).

Taiwanese Office Action issued on Oct. 11, 2022, in counterpart Taiwanese Patent Application No. 111114699 (5 pages in English, 4 pages in Chinese).

Taiwanese Office Action issued on Nov. 12, 2024, in counterpart Taiwanese Patent Application No. 113139001 (5 pages in English, 4 pages in Chinese).

Taiwanese Office Action Issued on Jun. 10, 2025, in Counterpart Taiwanese Patent Application No. 113139001 (6 Pages in English, 5 Pages in Chinese).

* cited by examiner

IMAGING LENS SYSTEM

CROSS-REFERENCE TO RELATED APPLICATIONS

This application claims the benefit under 35 USC 119(a) of Korean Patent Application No. 10-2021-0173554 filed on Dec. 7, 2021, in the Korean Intellectual Property Office, the entire disclosure of which is incorporated herein by reference for all purposes.

BACKGROUND

1. Field

This application relates to an imaging lens system that may be mounted on a camera requiring a wide field of view.

2. Description of the Background

Recently produced vehicles include cameras to significantly reduce damage to persons and property caused by traffic accidents. For example, one or more cameras may be installed on front and rear bumpers of a vehicle to provide a driver with information of objects located on the front and rear sides of the vehicle. Since it is important for a vehicle camera to accurately recognize objects around a vehicle and to provide information of the recognized objects to the driver, an imaging lens system having a high resolution and a wide field of view is required. However, limited installation space may make it difficult to mount an imaging lens system having a high resolution and a wide field of view in a vehicle camera. For example, a forwardmost lens and another lens should be manufactured to have large diameters to implement a vehicle camera having a low f-number. However, due to structural and design limitations of a vehicle component in which a camera is installed (for example, a bumper), it may be difficult to arbitrarily increase sizes of lenses.

The above information is presented as background information only to assist in gaining an understanding of the disclosure of this application. No determination has been made, and no assertion is made, as to whether any of the above information might be applicable as prior art with regard to the disclosure of this application.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system, wherein the second lens has a concave object object-side surface in a paraxial region thereof, and the imaging lens system satisfies the conditional expressions $f5/f6<-1.0$, $f1/f4<-2.4$, and $190° \leq HFOV$, where f is a focal length of the imaging lens system, f1 is a focal length of the first lens, f4 is a focal length of the fourth lens, f5 is a focal length of the fifth lens, and HFOV is a horizontal field of view of the imaging lens system.

The third lens may have a convex object-side surface in a paraxial region thereof.

The third lens may have a convex image-side surface in a paraxial region thereof.

The fifth lens may have a concave object-side surface in a paraxial region thereof.

The seventh lens may have a concave object-side surface in a paraxial region thereof.

The seventh lens may have a convex image-side surface in a paraxial region thereof.

The imaging lens system may further satisfy the conditional expression $0.03\ mm/° < L1ER1/HFOV < 0.06\ mm/°$, where L1ER1 is an effective radius of an object-side surface of the first lens.

The imaging lens system may further satisfy the conditional expression $0.10 < ImgHT/TTL < 0.20$, where ImgHT is a maximum effective image height on the imaging plane, and TTL is a distance along the optical axis from an object-side surface of the first lens to the imaging plane.

The imaging lens system may further satisfy the conditional expression $0.80 < D12/D23 < 1.60$, where D12 is a distance along the optical axis from an image-side surface of the first lens to the object-side surface of the second lens, and D23 is a distance along the optical axis from an image-side surface of the second lens to an object-side surface of the third lens.

The imaging lens system may further satisfy the conditional expression $4.0 < (R8+R11)/T5 < 8.0$, where R8 is a radius of curvature of an image-side surface of the fourth lens at the optical axis, R11 is a radius of curvature of an object-side surface of the sixth lens at the optical axis, and T5 is a thickness of the fifth lens along the optical axis.

In another general aspect, an imaging lens system includes a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system, wherein the imaging lens system satisfies the conditional expressions $90° \leq HFOV$ and $8.0°/mm < HFOV/TTL < 12.0°/mm$, where HFOV is a horizontal field of view of the imaging lens system, and TTL is a distance along the optical axis from an object-side surface of the first lens to the imaging plane.

The second lens may have a concave object-side surface in a paraxial region thereof.

The seventh lens may have a convex image-side surface in a paraxial region thereof.

The imaging lens system may further satisfy the conditional expression $20 < |R3/T2| < 60$, where R3 is a radius of curvature of an object-side surface of the second lens at the optical axis, and T2 is a thickness of the second lens along the optical axis.

The imaging lens system may further satisfy the conditional expression $46 < |(R9+R10)/T5| < 136$, where R9 is a radius of curvature of an object-side surface of the fifth lens at the optical axis, R10 is a radius of curvature of an image-side surface of the fifth lens at the optical axis, and T5 is a thickness of the fifth lens along the optical axis.

The imaging lens system may further satisfy the conditional expression $0.6 < |(R11+R12)/T6| < 1.6$, where R11 is a radius of curvature of an object-side surface of the sixth lens at the optical axis, R12 is a radius of curvature of an image-side surface of the sixth lens at the optical axis, and T6 is a thickness of the sixth lens along the optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
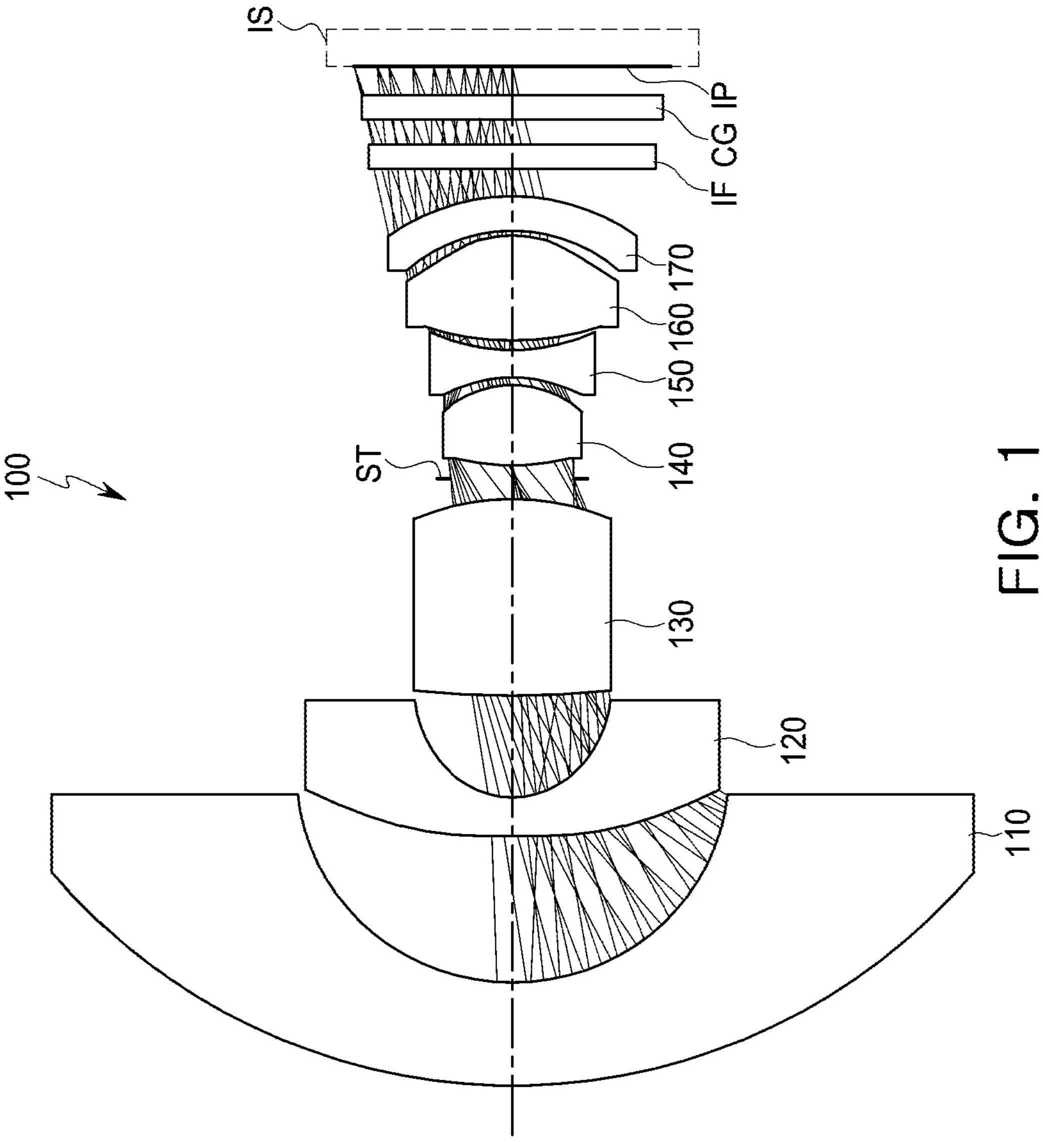
FIG. 1 is a diagram of an imaging lens system according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the term "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90° or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the drawings, thicknesses, sizes, and shapes of lenses may have been slightly exaggerated for convenience of explanation. In particular, shapes of spherical surfaces or aspherical surfaces illustrated in the drawings are illustrated by way of example. That is, the shapes of the spherical surfaces or the aspherical surfaces are not limited to those illustrated in the drawings.

In the embodiments described herein, a first lens refers to a lens closest to an object (or a subject), and a seventh lens refers to a lens closest to an imaging plane (or an image sensor).

A unit of radiuses of curvature of lens surfaces, thicknesses of lenses and other optical elements, gaps between lenses and other optical elements, TTL (a distance from an object-side surface of the first lens to the imaging plane), BFL (a distance from an image-side surface of the seventh lens to the imaging plane), ImgHT (a maximum effective image height on the imaging plane, which is equal to one half of a diagonal length of an effective imaging area of the imaging plane), focal lengths, and effective radiuses of surfaces of lenses and other optical elements are expressed in millimeters (mm).

Thicknesses of lenses and other optical elements, gaps between lenses and other optical elements, TTL, and BFL are measured along an optical axis of the imaging lens system. Radiuses of curvature of lens surfaces are measured at the optical axis.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle θ to the optical axis, and the approximations sin θ≈θ, tan θ≈θ, and cos θ≈1 are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as convex, the entire object-side surface of the lens may not be convex, and a peripheral region of the object-side surface of the lens may be concave. Also, even though the image-side surface of the lens may be described as concave, the entire image-side surface of the lens may not be concave, and a peripheral region of the image-side surface of the lens may be convex.

An effective aperture radius or effective radius of a lens surface is a radius of a portion of the lens surface through which light actually passes, and is not necessarily a radius of an outer edge of the lens surface. Stated another way, the effective aperture radius or effective radius of a lens surface is a distance in a direction perpendicular to an optical axis of the lens surface between the optical axis and a marginal ray of light passing through the lens surface. The object-side surface of a lens and the image-side surface of the lens may have different effective aperture radiuses or effective radiuses.

An imaging lens system described herein may be configured to be mounted on a transport device. For example, the imaging lens system may be mounted on a front and rear monitoring camera or an autonomous driving camera mounted on a passenger car, a truck, a freight car, a fire truck, a forklift, or other transportation device. However, a range and examples of use of the imaging lens system described herein are not limited to the above-described examples. For example, the imaging lens system may be mounted on an imaging camera of a surveillance drone or a transportation drone.

An imaging lens system according to a first embodiment may include a plurality of lenses. For example, the imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system. The imaging lens system according to the first embodiment may include a lens having a concave object-side surface. For example, in the imaging lens system according to the first embodiment, the second lens may have a concave object-side surface.

The imaging lens system according to the first embodiment may satisfy one or more conditional expressions. As an example, the imaging lens system according to the first embodiment may satisfy all of the following conditional expressions with respect to a focal length f of the imaging lens system, a focal length f1 of the first lens, a focal length f4 of the fourth lens, a focal length f5 of the fifth lens, and a horizontal field of view HFOV of the imaging lens system.

$$f5/f6<-1.0 \quad \text{(Conditional Expression 1)}$$

$$f1/f4<-2.4 \quad \text{(Conditional Expression 2)}$$

$$190°\leq \text{HFOV} \quad \text{(Conditional Expression 3)}$$

An imaging lens system according to a second embodiment may include a plurality of lenses. For example, the imaging lens system may include a first lens, a second lens, a third lens, a fourth lens, a fifth lens, a sixth lens, and a seventh lens sequentially disposed in ascending numerical order along an optical axis of the imaging lens system from an object side of the imaging lens system toward an imaging plane of the imaging lens system.

The imaging lens system according to the second embodiment may satisfy one or more conditional expressions. As an example, the imaging lens system according to the second embodiment may satisfy all of the following conditional expressions with respect to a horizontal field of view HFOV of the imaging lens system and a length TTL of the imaging lens system, i.e., a distance from an object-side surface of the first lens to the imaging plane.

$$190°\leq \text{HFOV} \quad \text{(Conditional Expression 3)}$$

$$8.0°/\text{mm}<\text{HFOV}/TTL<12.0°/\text{mm} \quad \text{(Conditional Expression 4)}$$

An imaging lens system according to a third embodiment may be configured to satisfy one or more of the following conditional expressions. As an example, the imaging lens system according to the third embodiment may include seven lenses, and may satisfy two or more of the following conditional expressions. As another example, the imaging lens system according to the third embodiment may include seven lenses, and may be configured to satisfy all of the following conditional expressions.

$f1/f<0$ (Conditional Expression 5)

$f1/f4<-2.4$ (Conditional Expression 2)

$f5/f6<-1.0$ (Conditional Expression 1)

$30<|V6-V5|$ (Conditional Expression 6)

$190°\leq HFOV$ (Conditional Expression 3)

$0.03\ mm/°<L1ER1/HFOV<0.06\ mm/°$ (Conditional Expression 7)

$0.10<ImgHT/TTL<0.20$ (Conditional Expression 8)

In the above conditional expressions, f is a focal length of the imaging lens system, f1 is a focal length of the first lens, f4 is a focal length of the fourth lens, f5 is a focal length of the fifth lens, V5 is an Abbe number of the fifth lens, V6 is an Abbe number of the sixth lens, HFOV is a horizontal field of view of the imaging lens system, L1ER1 is an effective radius of an object-side surface of the first lens, ImgHT is a maximum effective image height on an imaging plane, and TTL is a distance from an object-side surface of the first lens to the imaging plane.

The imaging lens system according to the third embodiment may satisfy some of the conditional expressions listed above in a more limited manner as listed below.

$-8.0<f1/f<-4.0$ (Conditional Expression 9)

$-4.0<f1/f4<-2.4$ (Conditional Expression 10)

$-3.0<f5/f6<-1.0$ (Conditional Expression 11)

$30<|V6-V5|<40$ (Conditional Expression 12)

$190°\leq HFOV<200°$ (Conditional Expression 13)

An imaging lens system according to a fourth embodiment may be configured to satisfy one or more of the following conditional expressions. For example, the imaging lens system according to the fourth embodiment may include seven lenses, and may satisfy at least two of the following conditional expressions. As another example, the imaging lens system according to the fourth embodiment may include seven lenses, and may be configured to satisfy all of the following conditional expressions.

$0.80<D12/D23<1.60$ (Conditional Expression 14)

$20<|R3/T2|<60$ (Conditional Expression 15)

$4.0<(R8+R11)/T5<8.0$ (Conditional Expression 16)

$46<|(R9+R10)/T5|<136$ (Conditional Expression 17)

$0.6<(R11+R12)/T6<1.6$ (Conditional Expression 18)

In the above conditional expressions, D12 is a distance from an image-side surface of the first lens to an object-side surface of the second lens, D23 is a distance from an image-side surface of the second lens to an object-side surface of the third lens, R3 is a radius of curvature of an object-side surface of the second lens, T2 is a thickness of the second lens, R8 is a radius of curvature of an image-side surface of the fourth lens, R9 is a radius of curvature of an object-side surface of the fifth lens, R10 is a radius of curvature of an image-side surface of the fifth lens, R11 is a radius of curvature of an object-side surface of the sixth lens, R12 is a radius of curvature of an image-side surface of the sixth lens, T5 is a thickness of the fifth lens, and T6 is a thickness of the sixth lens.

An imaging lens system according to an embodiment may include one or more lenses having the properties described below. As an example, the imaging lens system according to the first embodiment may include one of the first to seventh lenses having the properties described below. As another example, the imaging lens systems according to the second to fourth embodiments may include one or more of the first to seventh lenses having the properties described below. However, the imaging lens systems according to the above-described embodiments do not necessarily include lenses having the properties described below. Hereinafter, the first to seventh lenses will be described.

The first lens may have a refractive power. For example, the first lens may have a negative refractive power. The first lens may have one convex surface. For example, the first lens may have a convex object-side surface. The first lens may include a spherical surface. As an example, both surfaces of the first lens may be spherical. The first lens may be formed of a material having a high light transmissivity and an excellent workability. For example, the first lens may be formed of a plastic material or a glass material. The first lens may be configured to have a predetermined refractive index. As an example, the refractive index of the first lens may be greater than 1.7. As a detailed example, the refractive index of the first lens may be greater than 1.74 to less than 1.84. The first lens may have a predetermined Abbe number. As an example, the Abbe number of the first lens may be 40 or more. As a detailed example, the Abbe number of the first lens may be greater than 40 to less than 60.

The second lens may have a refractive power. For example, the second lens may have a negative refractive power. The second lens may have at least one concave surface. For example, the second lens may have a concave object-side surface. The second lens includes an aspherical surface. For example, both surfaces of the second lens may be aspherical. The second lens may include an inflection point. For example, an inflection point may be formed on the object-side surface of the second lens. The second lens may be formed of a material having a high light transmittance and an excellent workability. For example, the second lens may be formed of a plastic material or a glass material. The second lens may be configured to have a predetermined refractive index. For example, the refractive index of the second lens may be greater than 1.5. As a specific example, the refractive index of the second lens may be greater than 1.52 and less than 1.60. The second lens may have a predetermined Abbe number. For example, the Abbe number of the second lens may be 50 or more. As a specific example, the Abbe number of the second lens may be greater than 50 to less than 64.

The third lens may have a refractive power. For example, the third lens may have a positive refractive power. The third lens may have at least one convex surface. For example, the third lens may have a convex object-side surface or a convex image-side surface. The third lens may have an aspherical surface. As an example, both surfaces of the third lens may be aspherical. The third lens may be formed of a material having a high light transmissivity and an excellent workability. As an example, the third lens may be formed of a plastic material or a glass material. The third lens may be configured to have a predetermined refractive index. For example, the refractive index of the third lens may be greater than 1.6 to less than 1.9. The third lens may have a predetermined Abbe number. For example, the Abbe number of the third lens may be greater than 20 to less than 30.

The fourth lens may have a refractive power. For example, the fourth lens may have a positive refractive power. The fourth lens may have at least one convex surface. For example, the fourth lens may have a convex image-side surface. The fourth lens may have an aspherical surface. As an example, both surfaces of the fourth lens may be aspherical. The fourth lens may have an inflection point. As an example, the inflection point may be formed on an object-side surface of the fourth lens. The fourth lens may be formed of a material having a high light transmissivity and an excellent workability. For example, the fourth lens may be formed of a plastic material or a glass material. The fourth lens may be configured to have a predetermined refractive index. For example, the refractive index of the fourth lens may be greater than 1.46 to less than 1.56. The fourth lens may have a predetermined Abbe number. For example, the Abbe number of the fourth lens may be greater than 60 to less than 80.

The fifth lens may have a refractive power. For example, the fifth lens may have a negative refractive power. The fifth lens may have at least one concave surface. For example, the fifth lens may have a concave object-side surface or a concave image-side surface. The fifth lens may have an aspherical surface. As an example, both surfaces of the fifth lens may be aspherical. The fifth lens may include an inflection point. For example, the inflection point may be formed on the object-side surface of the fifth lens. The fifth lens may be formed of a material having a high light transmissivity and an excellent workability. For example, the fifth lens may be formed of a plastic material or a glass material. The fifth lens may be configured to have a predetermined refractive index. For example, the refractive index of the fifth lens may be greater than 1.6. As a detailed example, the refractive index of the fifth lens may be greater than 1.6 to less than 1.70. The fifth lens may have a predetermined Abbe number. For example, the Abbe number of the fifth lens may be 20 or more. As a detailed example, the Abbe number of the fifth lens may be greater than or equal to 20 to less than 30.

The sixth lens may have a refractive power. For example, the sixth lens may have a positive refractive power. The sixth lens may have at least one convex surface. For example, the sixth lens may have a convex image-side surface. The sixth lens may have an aspherical surface. As an example, both surfaces of the sixth lens may be aspherical. The sixth lens may have an inflection point. For example, the inflection point may be formed on the image-side surface of the sixth lens. The sixth lens may be formed of a material having a high light transmissivity and an excellent workability. For example, the sixth lens may be formed of a plastic material or a glass material. The sixth lens may be configured to have a predetermined refractive index. For example, the refractive index of the sixth lens may be greater than 1.50 to less than 1.60. The sixth lens may have a predetermined Abbe number. For example, the Abbe number of the sixth lens may be greater than 50 to less than 60.

The seventh lens may have a refractive power. For example, the seventh lens may have a negative refractive power. The seventh lens may have one concave surface. As an example, the seventh lens may have a concave object-side surface. The seventh lens may have one convex surface. As an example, the seventh lens may have a convex image-side surface. The seventh lens have an aspherical surface. As an example, both surfaces of the seventh lens may be aspherical. The seventh lens may have an inflection point. For example, the inflection point may be formed on either one or both of the object-side surface and the image-side surface of the seventh lens. The seventh lens may be formed of a material having a high light transmissivity and an excellent workability. For example, the seventh lens may be formed of a plastic material or a glass material. The seventh lens may be configured to have a predetermined refractive index. For example, the refractive index of the seventh lens may be greater than 1.60 to less than 1.74. The seventh lens may have a predetermined Abbe number. For example, the Abbe number of the seventh lens may be greater than 16 to less than 30.

As described above, the first to seventh lenses may have a spherical surface or an aspherical surface. The aspherical surfaces of the lenses may be represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c is a curvature of a lens surface and is equal to a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A, B, C, D, E, F, G, H, and J are aspherical constants, Z (or sag) is a distance in a direction parallel to the optical axis of the lens surface from the point on the lens surface at the distance r from the optical axis of the lens surface to a tangential plane perpendicular to the optical axis and intersecting a vertex of the lens surface.

The imaging lens system according to the above-described embodiments may further include a stop, a filter, and a cover glass. As an example, the imaging lens system may further include a stop disposed between the third lens and the fourth lens. The stop may be configured to adjust the amount of light incident on the imaging plane. As another example, the imaging lens system may further include a filter and a cover glass disposed between the seventh lens and the imaging plane. The filter may be configured to block a specific wavelength of light or a specific range of wavelengths of light, and the cover glass may be configured to block foreign substances from reaching the imaging plane. As an example, the filter may be configured to block infrared light, but may additionally or alternatively be configured to block ultraviolet light.

Figure 2:
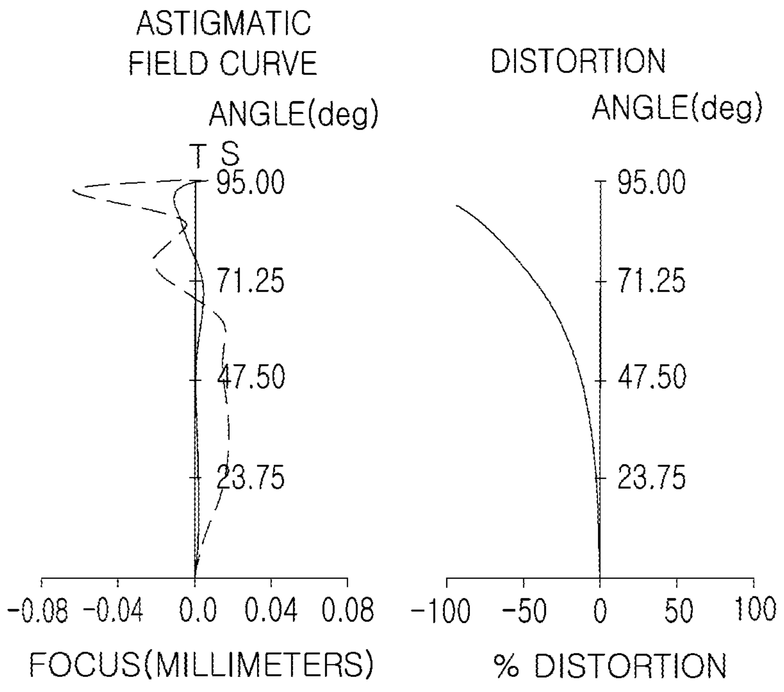
FIG. 2 illustrates aberration curves of the imaging lens system illustrated in FIG. 1.

FIG. 1 is a diagram of an imaging lens system according to a first embodiment, and FIG. 2 illustrates aberration curves of the imaging lens system illustrated in FIG. 1.

Referring to FIG. 1, an imaging lens system 100 may include a first lens 110, a second lens 120, a third lens 130, a fourth lens 140, a fifth lens 150, a sixth lens 160, and a seventh lens 170.

The first lens 110 may have a negative refractive power, and may have a convex object-side surface and a concave image-side surface. The second lens 120 may have a negative refractive power, and may have a concave object-side surface and a concave image-side surface. The third lens 130 may have a positive refractive power, and may have a convex object-side surface and a convex image-side surface. The fourth lens 140 may have a positive refractive power, and may have a convex object-side surface and a convex image-side surface. The fifth lens 150 may have a negative refractive power, and may have a concave object-side surface and a concave image-side surface. The sixth lens 160 may have a positive refractive power, and may have a convex object-side surface and a convex image-side surface. The seventh lens 170 may have a negative refractive power, and may have a concave object-side surface and a convex image-side surface.

The imaging lens system 100 may include a lens having an inflection point. For example, an inflection point may be formed on an object-side surface or an image-side surface of the second lens 120 and the fourth lens 140 to the seventh lens 170 in the imaging lens system 100 according to the first embodiment.

The imaging lens system 100 may further include a stop ST, a cover glass CG, a filter IF, and an imaging plane IP. The stop ST may be disposed between the third lens 130 and the fourth lens 140, and the cover glass CG and the filter IF may be disposed between the seventh lens 170 and the imaging plane IP. The imaging plane IP may be formed on a surface of an image sensor IS of a camera module or inside the image sensor IS.

Tables 1 and 2 below list lens properties and aspherical values of the imaging lens system according to the first embodiment.

TABLE 1

| Surface No. | Component | Radius of Curvature | Thickness/ Distance | Refractive Index | Abbe Number | Effective Radius |
|---|---|---|---|---|---|---|
| S1 | First | 11.1977 | 1.8150 | 1.776 | 49.6 | 8.367 |
| S2 | Lens | 3.9358 | 2.6242 | | | 3.892 |
| S3 | Second | −23.0691 | 0.6449 | 1.539 | 56.5 | 3.752 |
| S4 | Lens | 1.8905 | 1.8171 | | | 1.850 |
| S5 | Third | 16.7440 | 3.4657 | 1.656 | 21.5 | 1.819 |
| S6 | Lens | −5.6521 | 0.3414 | | | 1.290 |
| S7 | Stop | Infinity | 0.2362 | | | 1.100 |
| S8 | Fourth | 4.0951 | 1.4238 | 1.552 | 75.5 | 1.169 |
| S9 | Lens | −2.5028 | 0.1207 | | | 1.293 |
| S10 | Fifth | −66.0853 | 0.5000 | 1.646 | 23.5 | 1.279 |
| S11 | Lens | 2.0794 | 0.1506 | | | 1.544 |
| S12 | Sixth | 4.8641 | 1.8904 | 1.539 | 56.5 | 1.635 |
| S13 | Lens | −2.1551 | 0.0622 | | | 1.934 |
| S14 | Seventh | −2.1890 | 0.6462 | 1.646 | 23.5 | 1.969 |
| S15 | Lens | −2.6371 | 0.4645 | | | 2.287 |
| S16 | Cover | Infinity | 0.4000 | 1.519 | 64.2 | 2.545 |
| S17 | Glass | Infinity | 0.4645 | | | 2.601 |
| S18 | Filter | Infinity | 0.4000 | 1.519 | 64.2 | 2.700 |
| S19 | | Infinity | 0.5326 | | | 2.756 |
| S20 | Imaging Plane | Infinity | 0.0000 | | | 2.883 |

TABLE 2

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.63835 | 0.32718 | −0.05060 | −0.00937 | −0.03781 | −0.07664 |
| B | −0.40700 | −0.03447 | −0.00260 | 0.00023 | −0.00923 | 0.00346 |
| C | 0.11967 | −0.02506 | −0.00023 | 0.00003 | −0.00190 | −0.00194 |
| D | −0.03339 | −0.00402 | 0.00067 | 0.00000 | −0.00037 | 0.00024 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

| Surface No. | S10 | S11 | S12 | S13 | S14 | S15 |
|---|---|---|---|---|---|---|
| k | 0.00000 | 0.00000 | 0.00000 | 0.00000 | 0.00000 | 0.00000 |
| A | −0.26760 | −0.40589 | 0.00809 | 0.32231 | 0.66569 | 0.71732 |
| B | 0.01887 | 0.02422 | −0.00771 | 0.08991 | −0.04384 | −0.13722 |
| C | −0.00059 | −0.00385 | 0.00019 | −0.02094 | −0.01246 | 0.02113 |
| D | 0.00038 | 0.00053 | −0.00017 | 0.00535 | 0.00872 | 0.00009 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 3:
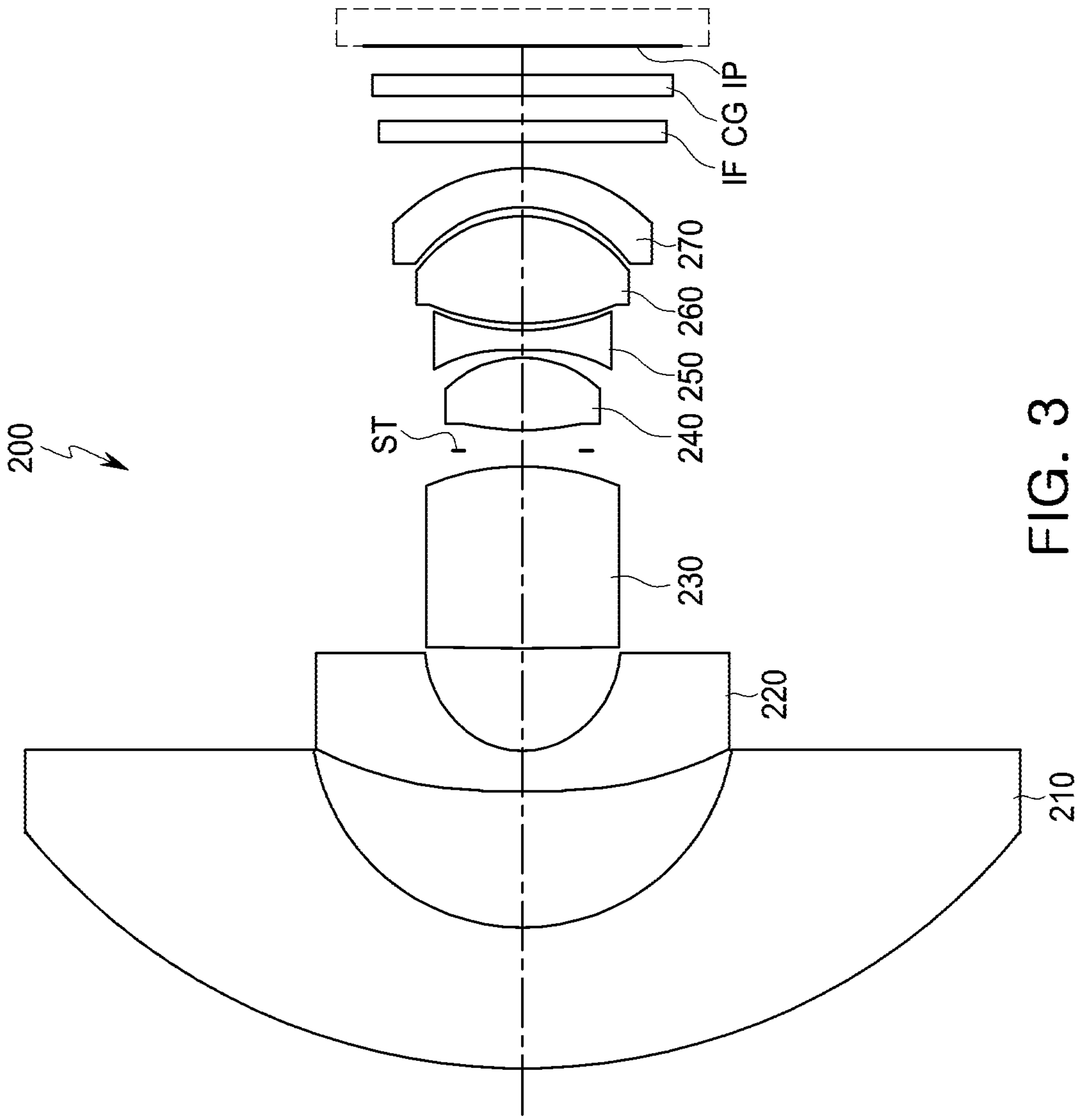
FIG. 3 is a diagram of an imaging lens system according to a second embodiment.
Figure 4:
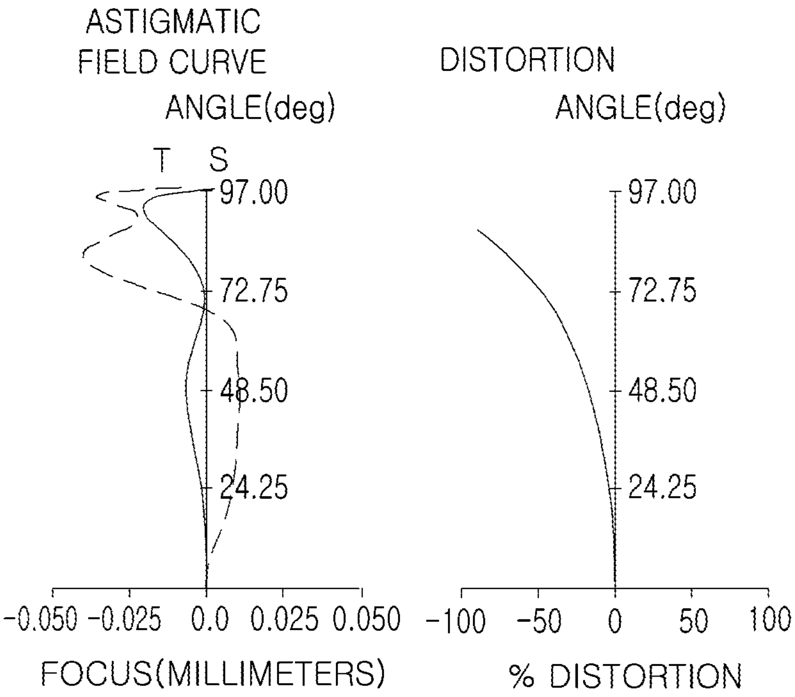
FIG. 4 illustrates aberration curves of the imaging lens system illustrated in FIG. 3.

FIG. 3 is a diagram of an imaging lens system according to a second embodiment, and FIG. 4 illustrates aberration curves of the imaging lens system illustrated in FIG. 3.

Referring to FIG. 3, an imaging lens system 200 may include a first lens 210, a second lens 220, a third lens 230, a fourth lens 240, a fifth lens 250, a sixth lens 260, and a seventh lens 270.

The first lens 210 may have a negative refractive power, and may have a convex object-side surface and a concave image-side surface. The second lens 220 may have a negative refractive power, and may have a concave object-side surface and a concave image-side surface. The third lens 230 may have a positive refractive power, and may have a convex object-side surface and a convex image-side surface. The fourth lens 240 may have a positive refractive power, and may have a convex object-side surface and a convex image-side surface. The fifth lens 250 may have a negative refractive power, and may have a convex object-side surface and a concave image-side surface. The sixth lens 260 may have a positive refractive power, and may have a convex object-side surface and a convex image-side surface. The seventh lens 270 may have a negative refractive power, and may have a concave object-side surface and a convex image-side surface.

The imaging lens system 200 may include a lens having an inflection point. For example, the inflection point may be formed on an object-side surface or an image-side surface of the second lens 220 and the fourth lens 240 to the seventh lens 270 in the imaging lens system 200 according to the second embodiment.

The imaging lens system 200 may further include a stop ST, a cover glass CG, a filter IF, and an imaging plane IP. The stop ST may be disposed between the third lens 230 and the fourth lens 240, and the cover glass CG and the filter IF may be disposed between the seventh lens 270 and the imaging plane IP. The imaging plane IP may be formed on a surface of an image sensor IS of a camera module or inside the image sensor IS.

Tables 3 and 4 below list lens properties and aspherical values of the imaging lens system according to the second embodiment.

TABLE 3

| Surface No. | Component | Radius of Curvature | Thickness/ Distance | Refractive Index | Abbe Number | Effective Radius |
|---|---|---|---|---|---|---|
| S1 | First | 12.6036 | 2.5943 | 1.776 | 49.6 | 9.481 |
| S2 | Lens | 3.9999 | 2.5703 | | | 3.944 |
| S3 | Second | −19.8673 | 0.7151 | 1.539 | 56.5 | 3.982 |
| S4 | Lens | 1.9337 | 1.9086 | | | 1.880 |
| S5 | Third | 28.5011 | 3.3518 | 1.825 | 23.3 | 1.851 |
| S6 | Lens | −6.2218 | 0.3254 | | | 1.395 |
| S7 | Stop | Infinity | 0.3821 | | | 1.089 |
| S8 | Fourth | 4.3491 | 1.3588 | 1.517 | 75.5 | 1.260 |
| S9 | Lens | −2.5837 | 0.1127 | | | 1.448 |
| S10 | Fifth | 19.4802 | 0.3579 | 1.650 | 22.8 | 1.457 |
| S11 | Lens | 2.0857 | 0.1458 | | | 1.668 |
| S12 | Sixth | 4.5126 | 2.0295 | 1.539 | 56.5 | 1.783 |
| S13 | Lens | −2.2422 | 0.1000 | | | 2.024 |
| S14 | Seventh | −2.2224 | 0.7741 | 1.689 | 18.4 | 2.002 |
| S15 | Lens | −2.7210 | 0.4646 | | | 2.446 |
| S16 | Cover | Infinity | 0.4000 | 1.519 | 64.2 | 2.703 |
| S17 | Glass | Infinity | 0.4646 | | | 2.748 |
| S18 | Filter | Infinity | 0.4000 | 1.519 | 64.2 | 2.827 |
| S19 | | Infinity | 0.4689 | | | 2.872 |
| S20 | Imaging Plane | Infinity | 0.0000 | | | 2.958 |

TABLE 4

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.61218 | 0.43095 | −0.06234 | −0.02008 | −0.05343 | −0.13917 |
| B | −0.39683 | 0.01318 | −0.00310 | 0.00022 | −0.01181 | −0.01348 |
| C | 0.09776 | −0.01747 | −0.00001 | 0.00006 | −0.00236 | −0.00363 |
| D | −0.01749 | −0.00412 | 0.00090 | 0.00000 | −0.00040 | −0.00021 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

| Surface No. | S10 | S11 | S12 | S13 | S14 | S15 |
|---|---|---|---|---|---|---|
| k | 0.00000 | 0.00000 | 0.00000 | 0.00000 | 0.00000 | 0.00000 |
| A | −0.40577 | −0.45845 | −0.01550 | 0.18595 | 0.29696 | 0.61902 |
| B | 0.04299 | 0.02820 | −0.00692 | 0.07256 | −0.03617 | −0.11269 |
| C | 0.00277 | −0.00505 | 0.00030 | −0.02912 | −0.02419 | 0.02777 |
| D | 0.00058 | 0.00033 | −0.00031 | 0.00235 | 0.00181 | 0.00467 |
| E | 0 | 0 | 0 | 0 | 0 | 0 |
| F | 0 | 0 | 0 | 0 | 0 | 0 |
| G | 0 | 0 | 0 | 0 | 0 | 0 |

TABLE 4-continued

| | | | | | | |
|---|---|---|---|---|---|---|
| H | 0 | 0 | 0 | 0 | 0 | 0 |
| J | 0 | 0 | 0 | 0 | 0 | 0 |

Figure 5:
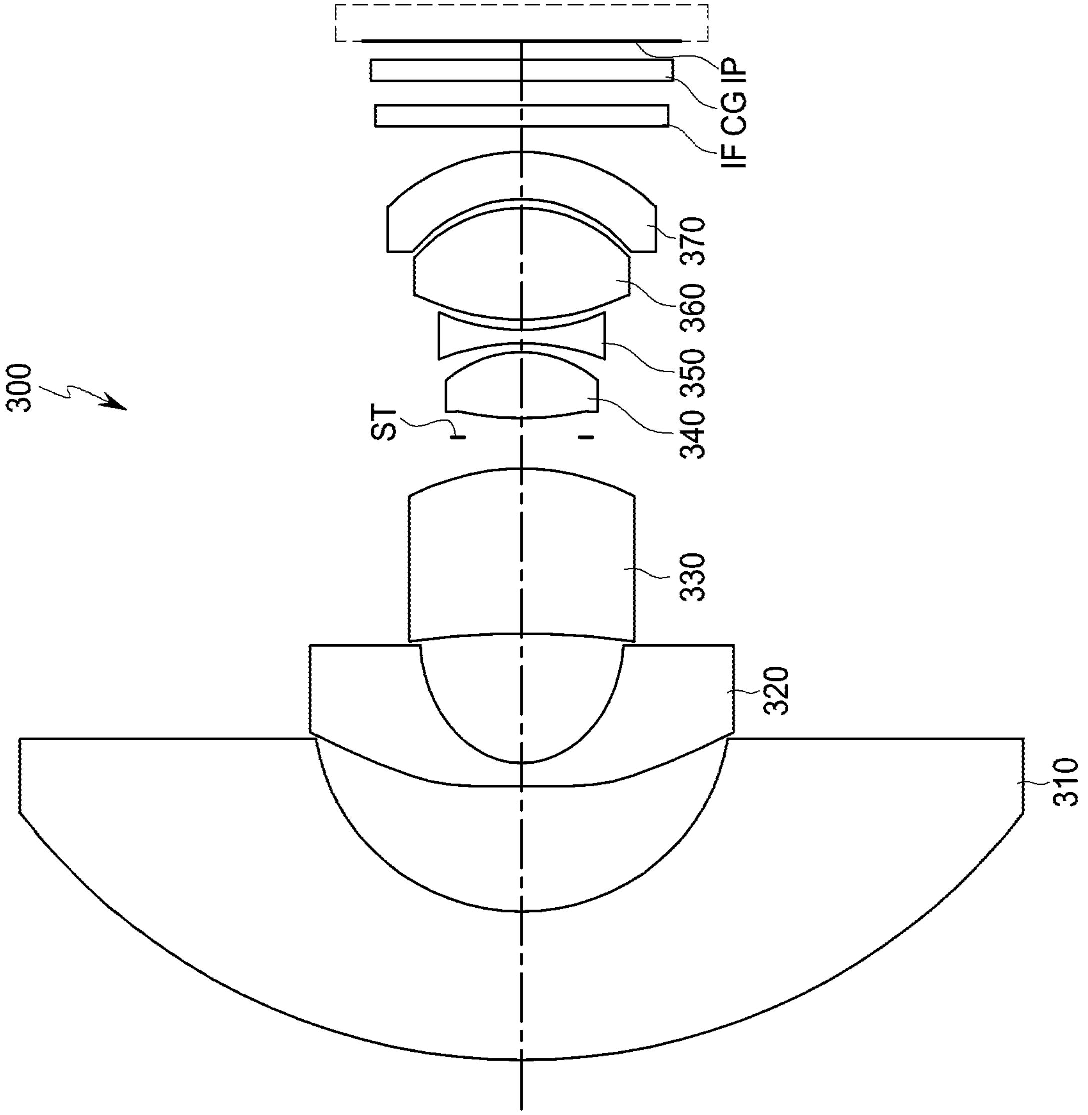
FIG. 5 is a diagram of an imaging lens system according to a third embodiment.
Figure 6:
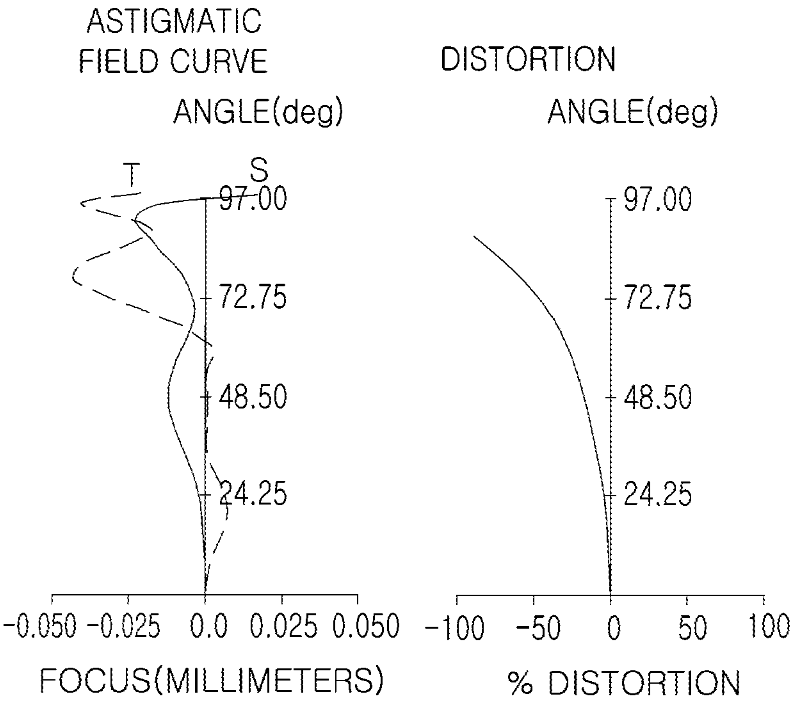
FIG. 6 illustrates aberration curves of the imaging lens system illustrated in FIG. 5.

FIG. 5 is a diagram of an imaging lens system according to a third embodiment, and FIG. 6 illustrates aberration curves of the imaging lens system illustrated in FIG. 5.

Referring to FIG. 5, an imaging lens system 300 may include a first lens 310, a second lens 320, a third lens 330, a fourth lens 340, a fifth lens 350, a sixth lens 360, and a seventh lens 370.

The first lens 310 may have a negative refractive power, and may have a convex object-side surface and a concave image-side surface. The second lens 320 may have a negative refractive power, and may have a concave object-side surface and a concave image-side surface. The third lens 330 may have a positive refractive power, and may have a concave object-side surface and a convex image-side surface. The fourth lens 340 may have a positive refractive power, and may have a convex object-side surface and a convex image-side surface. The fifth lens 350 may have a negative refractive power, and may have a convex object-side surface and a concave image-side surface. The sixth lens 360 may have a positive refractive power, and may have a convex object-side surface and a convex image-side surface. The seventh lens 370 may have a negative refractive power, and may have a concave object-side surface and a convex image-side surface.

The imaging lens system 300 may include a lens having an inflection point. For example, the inflection point may be formed on an object-side surface or an image-side surface of the second lens 320 and the fourth lens 340 to the seventh lens 370 in the imaging lens system 300 according to the third embodiment.

The imaging lens system 300 may further include a stop ST, a cover glass CG, a filter IF, and an imaging plane IP. The stop ST may be disposed between the third lens 330 and the fourth lens 340, and the cover glass CG and the filter IF may be disposed between the seventh lens 370 and the imaging plane IP. The imaging plane IP may be formed on a surface of an image sensor IS of a camera module or inside the image sensor IS.

Tables 5 and 6 below list lens properties and aspherical values of the imaging lens system according to the third embodiment.

TABLE 5

| Surface No. | Component | Radius of Curvature | Thickness/ Distance | Refractive Index | Abbe Number | Effective Radius |
|---|---|---|---|---|---|---|
| S1 | First | 12.2697 | 2.7651 | 1.776 | 49.6 | 9.596 |
| S2 | Lens | 4.0447 | 2.3527 | | | 3.984 |
| S3 | Second | −18.4862 | 0.4553 | 1.539 | 56.5 | 4.081 |
| S4 | Lens | 2.0697 | 2.0958 | | | 1.999 |
| S5 | Third | −85.8225 | 3.3600 | 1.662 | 21.2 | 2.143 |
| S6 | Lens | −4.4065 | 0.5971 | | | 1.626 |
| S7 | Stop | Infinity | 0.3416 | | | 1.093 |
| S8 | Fourth | 4.4257 | 1.2604 | 1.517 | 75.5 | 1.299 |
| S9 | Lens | −2.7189 | 0.1353 | | | 1.449 |
| S10 | Fifth | 15.5182 | 0.2500 | 1.650 | 22.8 | 1.404 |
| S11 | Lens | 2.1121 | 0.1702 | | | 1.576 |
| S12 | Sixth | 4.2549 | 2.1750 | 1.539 | 56.5 | 1.862 |
| S13 | Lens | −2.3663 | 0.1000 | | | 2.074 |
| S14 | Seventh | −2.6595 | 0.9002 | 1.689 | 18.4 | 2.062 |
| S15 | Lens | −2.8722 | 0.4646 | | | 2.546 |
| S16 | Cover | Infinity | 0.4000 | 1.519 | 64.2 | 2.764 |
| S17 | Glass | Infinity | 0.4646 | | | 2.802 |
| S18 | Filter | Infinity | 0.4000 | 1.519 | 64.2 | 2.870 |
| S19 | | Infinity | 0.3122 | | | 2.908 |
| S20 | Imaging Plane | Infinity | 0.0000 | | | 2.959 |

TABLE 6

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.59031 | 0.53931 | −0.06055 | 0.00830 | −0.02751 | −0.14239 |
| B | −0.38991 | 0.02226 | −0.00465 | 0.00067 | −0.00895 | −0.01183 |
| C | 0.08814 | −0.01455 | −0.00081 | 0.00020 | −0.00188 | −0.00520 |
| D | −0.01083 | −0.00488 | 0.00042 | 0.00000 | −0.00026 | −0.00019 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

| Surface No. | S10 | S11 | S12 | S13 | S14 | S15 |
|---|---|---|---|---|---|---|
| k | 0.00000 | 0.00000 | 0.00000 | 0.00000 | 0.00000 | 0.00000 |
| A | −0.40602 | −0.44661 | −0.01295 | 0.19628 | 0.30108 | 0.61138 |
| B | 0.04700 | 0.03237 | −0.00414 | 0.09140 | −0.03661 | −0.13519 |

TABLE 6-continued

| | | | | | | |
|---|---|---|---|---|---|---|
| C | 0.00258 | −0.00453 | 0.00114 | −0.03110 | −0.02646 | 0.02113 |
| D | 0.00057 | 0.00026 | −0.00018 | 0.00577 | 0.00238 | 0.00310 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 7:
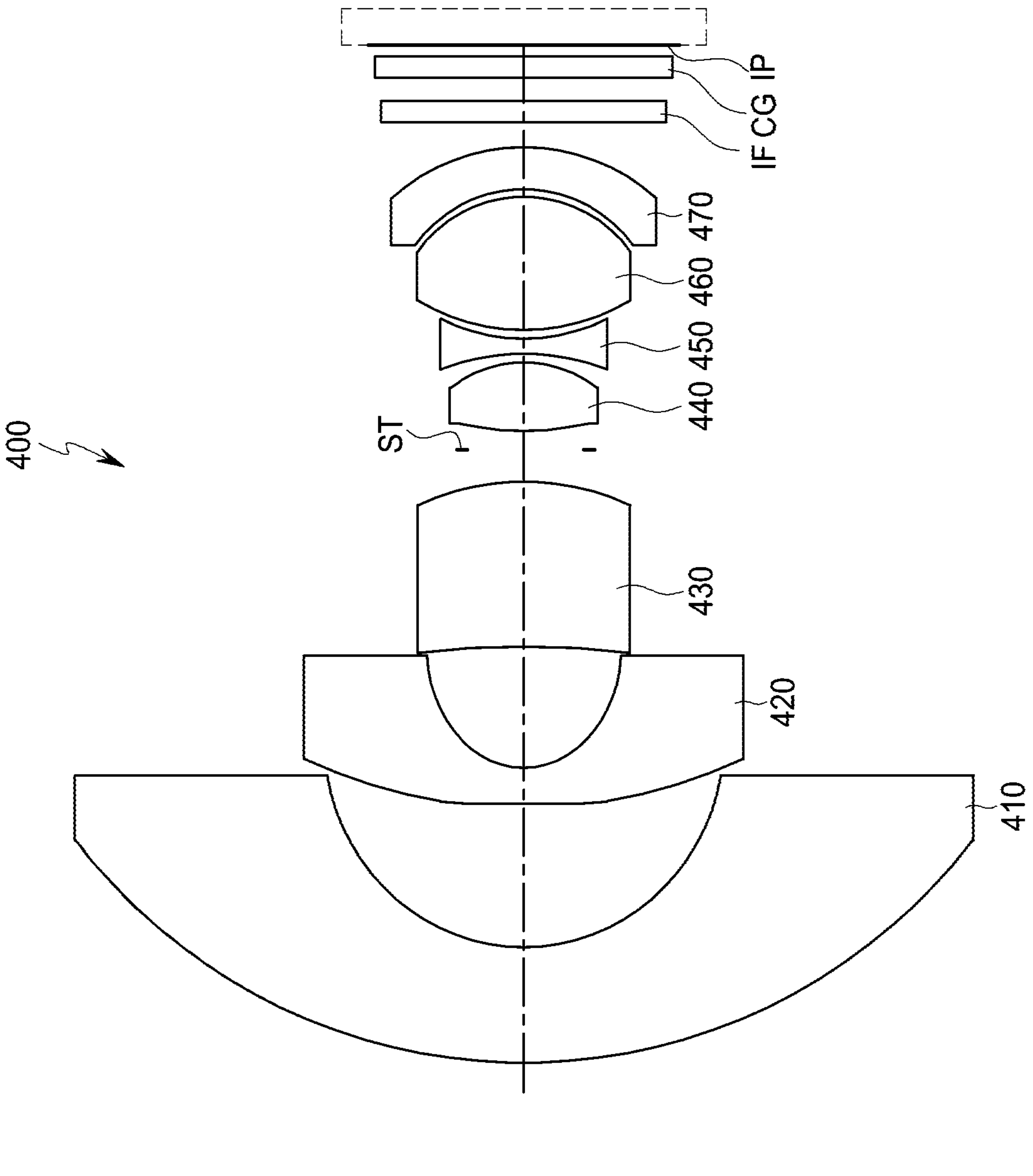
FIG. 7 is a diagram of an imaging lens system according to a fourth embodiment.
Figure 8:
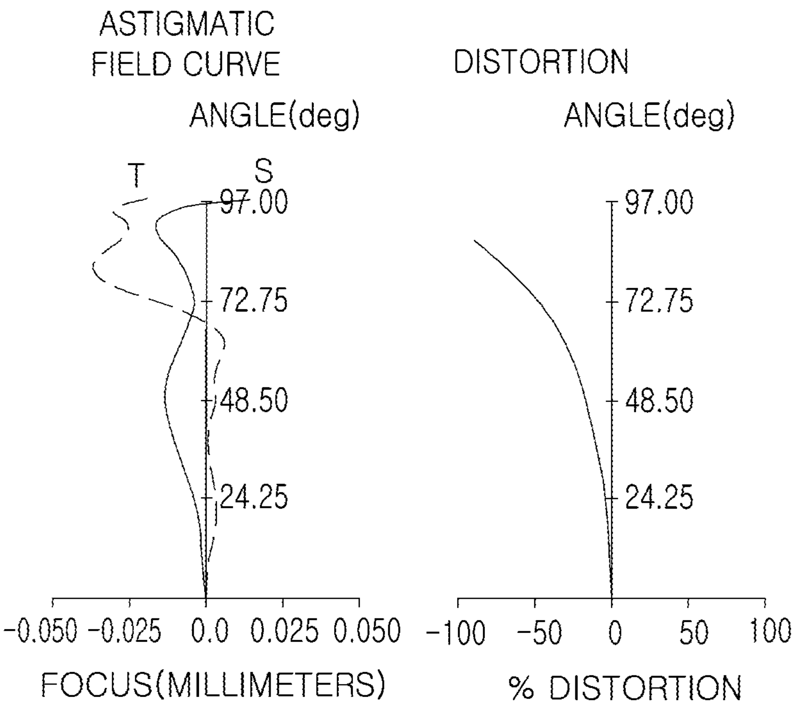
FIG. 8 illustrates aberration curves of the imaging lens system illustrated in FIG. 7.

FIG. 7 is a diagram of an imaging lens system according to a fourth embodiment, and FIG. 8 illustrates aberration curves of the imaging lens system illustrated in FIG. 7.

Referring to FIG. 7, an imaging lens system 400 may include a first lens 410, a second lens 420, a third lens 430, a fourth lens 440, a fifth lens 450, a sixth lens 460, and a seventh lens 470.

The first lens 410 may have a negative refractive power, and may have a convex object-side surface and a concave image-side surface. The second lens 420 may have a negative refractive power, and may have a concave object-side surface and a concave image-side surface. The third lens 430 may have a positive refractive power, and may have a concave object-side surface and a convex image-side surface. The fourth lens 440 may have a positive refractive power and may have a convex object-side surface and a convex image-side surface. The fifth lens 450 may have a negative refractive power, and may have a convex object-side surface and a concave image-side surface. The sixth lens 460 may have a positive refractive power, and may have a convex object-side surface and a convex image-side surface. The seventh lens 470 may have a negative refractive power, and may have a concave object-side surface and a convex image-side surface.

The imaging lens system 400 may include a lens having an inflection point. For example, the inflection point may be formed on an object-side surface or an image-side surface of the second lens 420 and the fourth lens 440 to the seventh lens 470 in the imaging lens system 400 according to the fourth embodiment.

The imaging lens system 400 may further include a stop ST, a cover glass CG, a filter IF, and an imaging plane IP. The stop ST may be disposed between the third lens 430 and the fourth lens 440, and the cover glass CG and the filter IF may be disposed between the seventh lens 470 and the imaging plane IP. The imaging plane IP may be formed on a surface of an image sensor IS of a camera module or inside the image sensor IS.

Tables 7 and 8 below list lens properties and aspherical values of the imaging lens system according to the fourth embodiment.

TABLE 7

| Surface No. | Component | Radius of Curvature | Thickness/ Distance | Refractive Index | Abbe Number | Effective Radius |
|---|---|---|---|---|---|---|
| S1 | First | 11.3097 | 2.2467 | 1.776 | 49.6 | 8.834 |
| S2 | Lens | 3.9939 | 2.3527 | | | 3.934 |
| S3 | Second | −14.4667 | 0.6773 | 1.539 | 56.5 | 4.337 |
| S4 | Lens | 2.1289 | 2.0958 | | | 2.048 |
| S5 | Third | −114.0808 | 3.3600 | 1.662 | 21.2 | 2.127 |
| S6 | Lens | −4.7112 | 0.5971 | | | 1.616 |
| S7 | Stop | Infinity | 0.3416 | | | 1.122 |
| S8 | Fourth | 4.4080 | 1.3370 | 1.517 | 75.5 | 1.331 |
| S9 | Lens | −2.7516 | 0.1353 | | | 1.495 |
| S10 | Fifth | 13.1845 | 0.2800 | 1.650 | 22.8 | 1.495 |
| S11 | Lens | 2.1019 | 0.1702 | | | 1.659 |
| S12 | Sixth | 4.0556 | 2.5477 | 1.539 | 56.5 | 1.887 |
| S13 | Lens | −2.3692 | 0.1000 | | | 2.146 |
| S14 | Seventh | −2.3823 | 0.8404 | 1.689 | 18.4 | 2.115 |
| S15 | Lens | −2.9366 | 0.4646 | | | 2.589 |
| S16 | Cover | Infinity | 0.4000 | 1.519 | 64.2 | 2.792 |
| S17 | Glass | Infinity | 0.4646 | | | 2.828 |
| S18 | Filter | Infinity | 0.4000 | 1.519 | 64.2 | 2.892 |
| S19 | | Infinity | 0.1889 | | | 2.929 |
| S20 | Imaging Plane | Infinity | 0.0000 | | | 2.956 |

TABLE 8

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.59031 | 0.51763 | −0.05892 | 0.00692 | −0.02245 | −0.13962 |
| B | −0.35988 | 0.01952 | −0.00355 | 0.00124 | −0.00599 | −0.01464 |
| C | 0.07413 | −0.01767 | −0.00059 | 0.00026 | −0.00114 | −0.00518 |
| D | −0.00849 | −0.00494 | 0.00048 | 0.00000 | −0.00013 | −0.00015 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |

TABLE 8-continued

| | | | | | | |
|---|---|---|---|---|---|---|
| J | 0 | 0 | 0 | 0 | 0 | 0 |
| Surface No. | S10 | S11 | S12 | S13 | S14 | S15 |
| k | 0.00000 | 0.00000 | 0.00000 | 0.00000 | 0.00000 | 0.00000 |
| A | −0.40555 | −0.44655 | −0.01379 | 0.19628 | 0.30108 | 0.61138 |
| B | 0.04341 | 0.02367 | −0.00692 | 0.09512 | −0.03355 | −0.13002 |
| C | 0.00218 | −0.00436 | 0.00220 | −0.02223 | −0.02119 | 0.02257 |
| D | 0.00057 | −0.00024 | −0.00059 | 0.00624 | 0.00251 | 0.00053 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 9:
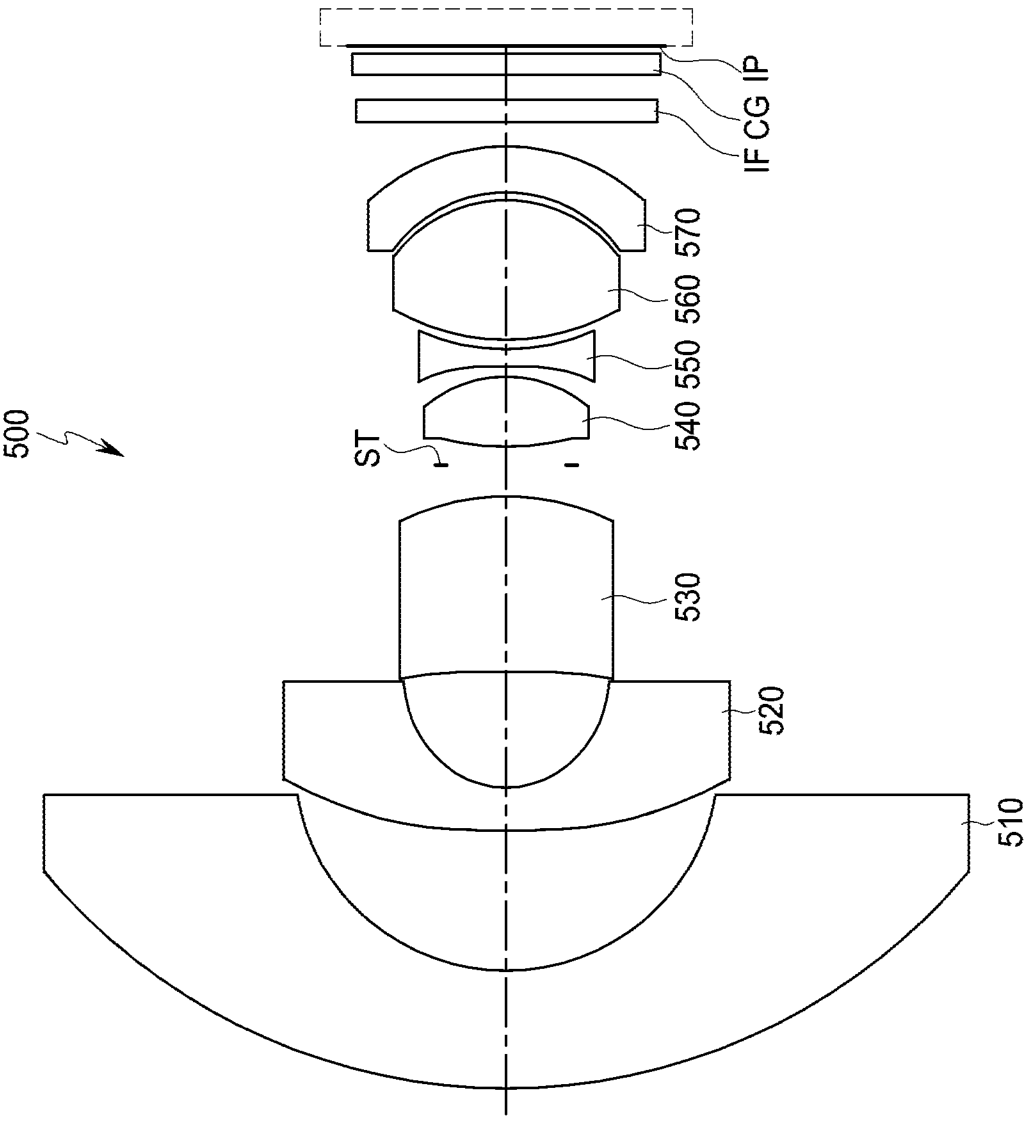
FIG. 9 is a diagram of an imaging lens system according to a fifth embodiment.
Figure 10:
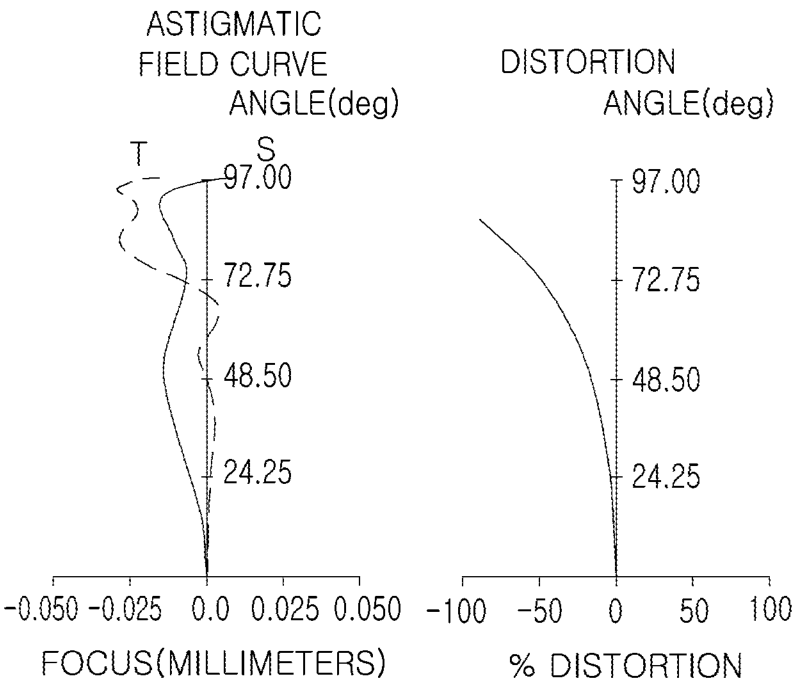
FIG. 10 illustrates aberration curves of the imaging lens system illustrated in FIG. 9.

FIG. 9 is a diagram of an imaging lens system according to a fifth embodiment, and FIG. 10 illustrates aberration curves of the imaging lens system illustrated in FIG. 9.

Referring to FIG. 9, an imaging lens system 500 may include a first lens 510, a second lens 520, a third lens 530, a fourth lens 540, a fifth lens 550, a sixth lens 560, and a seventh lens 570.

The first lens 510 may have a negative refractive power, and may have a convex object-side surface and a concave image-side surface. The second lens 520 may have a negative refractive power, and may have a concave object-side surface and a concave image-side surface. The third lens 530 may have a positive refractive power, and may have a concave object-side surface and a convex image-side surface. The fourth lens 540 may have a positive refractive power, and may have a convex object-side surface and a convex image-side surface. The fifth lens 550 may have a negative refractive power, and may have a convex object-side surface and a concave image-side surface. The sixth lens 560 may have a positive refractive power and may have a convex object-side surface and a convex image-side surface. The seventh lens 570 may have a negative refractive power, and may have a concave object-side surface and a convex image-side surface.

The imaging lens system 500 may include a lens having an inflection point. For example, the inflection point may be formed on an object-side surface or an image-side surface of the second lens 520 and the fourth lens 540 to the seventh lens 570 in the imaging lens system 500 according to the fifth embodiment.

The imaging lens system 500 may further include a stop ST, a cover glass CG, a filter IF, and an imaging plane IP. The stop ST may be disposed between the third lens 530 and the fourth lens 540, and the cover glass CG and the filter IF may be disposed between the seventh lens 570 and the imaging plane IP. The imaging plane IP may be formed on a surface of a image sensor IS of a camera module or inside the image sensor IS.

Tables 9 and 10 below list lens properties and aspherical values of the imaging lens system according to the fifth embodiment.

TABLE 9

| Surface No | Component | Radius of Curvature | Thickness/ Distance | Refractive Index | Abbe Number | Effective Radius |
|---|---|---|---|---|---|---|
| S1 | First | 12.0939 | 2.0982 | 1.776 | 49.6 | 8.947 |
| S2 | Lens | 4.1147 | 2.3215 | | | 4.045 |
| S3 | Second | −20.5853 | 0.7947 | 1.539 | 56.5 | 4.292 |
| S4 | Lens | 2.0847 | 2.0949 | | | 2.005 |
| S5 | Third | −46.0429 | 3.3600 | 1.657 | 21.5 | 2.039 |
| S6 | Lens | −4.4261 | 0.5536 | | | 1.609 |
| S7 | Stop | Infinity | 0.3436 | | | 1.155 |
| S8 | Fourth | 4.6393 | 1.3275 | 1.520 | 74.7 | 1.390 |
| S9 | Lens | −2.7953 | 0.1724 | | | 1.549 |
| S10 | Fifth | 11.8275 | 0.2800 | 1.674 | 20.4 | 1.526 |
| S11 | Lens | 2.1650 | 0.2068 | | | 1.676 |
| S12 | Sixth | 4.1713 | 2.6477 | 1.539 | 56.5 | 1.896 |
| S13 | Lens | −2.4277 | 0.1000 | | | 2.184 |
| S14 | Seventh | −2.4215 | 0.8700 | 1.657 | 21.5 | 2.163 |
| S15 | Lens | −3.0219 | 0.4646 | | | 2.649 |
| S16 | Cover | Infinity | 0.4000 | 1.519 | 64.2 | 2.825 |
| S17 | Glass | Infinity | 0.4646 | | | 2.857 |
| S18 | Filter | Infinity | 0.4000 | 1.519 | 64.2 | 2.914 |
| S19 | | Infinity | 0.1000 | | | 2.946 |
| S20 | Imaging Plane | Infinity | 0.0000 | | | 2.961 |

TABLE 10

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.86206 | 0.54975 | −0.09545 | 0.01181 | −0.02869 | −0.06965 |

TABLE 10-continued

| | | | | | | |
|---|---|---|---|---|---|---|
| B | −0.43711 | 0.02014 | −0.00439 | 0.00110 | −0.00861 | −0.01180 |
| C | 0.10665 | −0.01869 | 0.00028 | 0.00029 | −0.00172 | −0.00261 |
| D | −0.01793 | −0.00379 | 0.00071 | −0.00003 | −0.00018 | −0.00017 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

| Surface No. | S10 | S11 | S12 | S13 | S14 | S15 |
|---|---|---|---|---|---|---|
| k | 0.00000 | 0.00000 | 0.00000 | 0.00000 | 0.00000 | 0.00000 |
| A | −0.32926 | −0.39055 | −0.01125 | 0.20233 | 0.31869 | 0.67508 |
| B | 0.02512 | 0.01785 | −0.00734 | 0.09528 | −0.03614 | −0.14952 |
| C | 0.00142 | −0.00256 | 0.00202 | −0.02299 | −0.02268 | 0.03161 |
| D | 0.00033 | −0.00024 | −0.00046 | 0.00674 | 0.00362 | −0.00107 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 11:
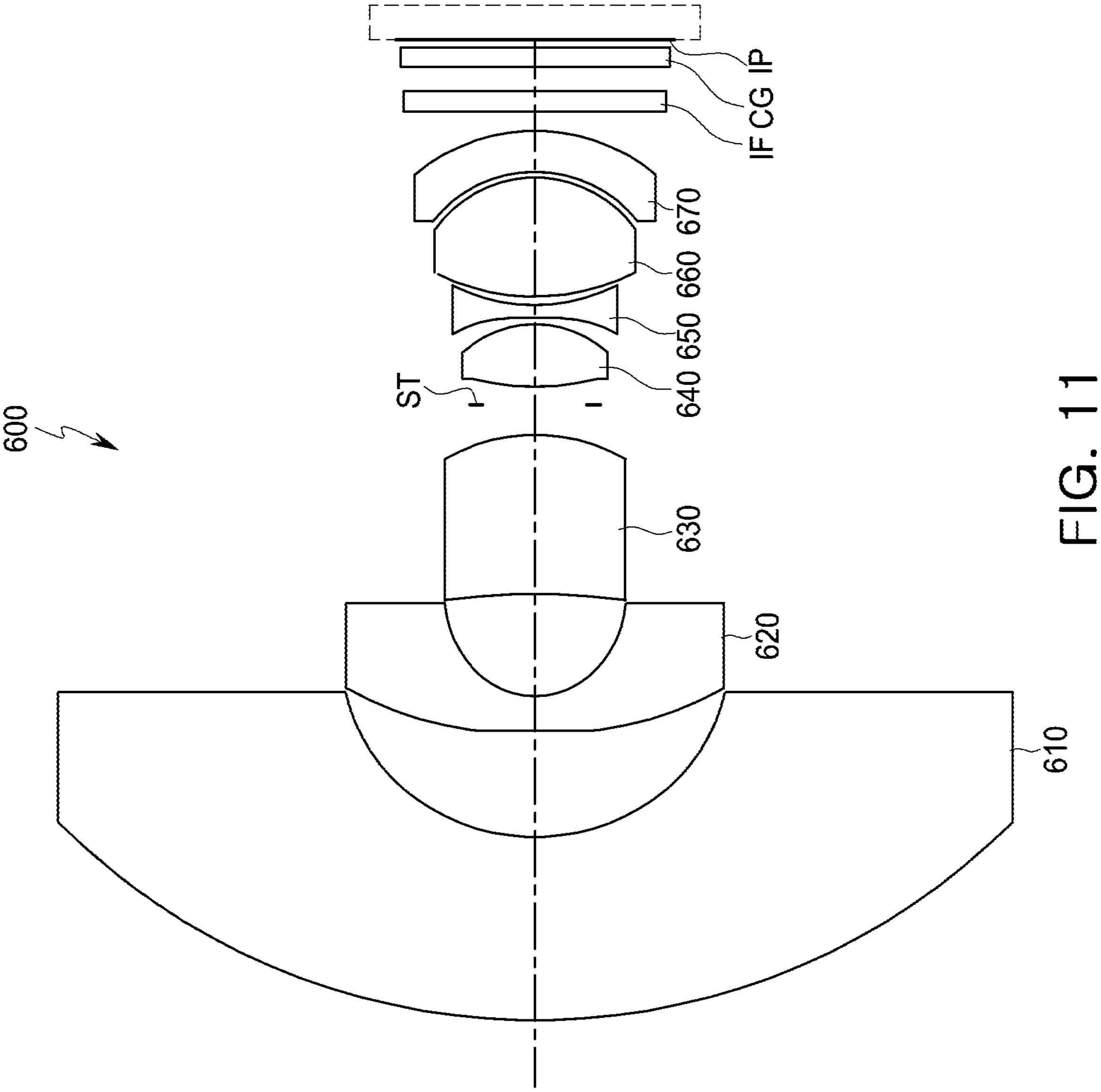
FIG. 11 is a diagram of an imaging lens system according to a sixth embodiment.
Figure 12:
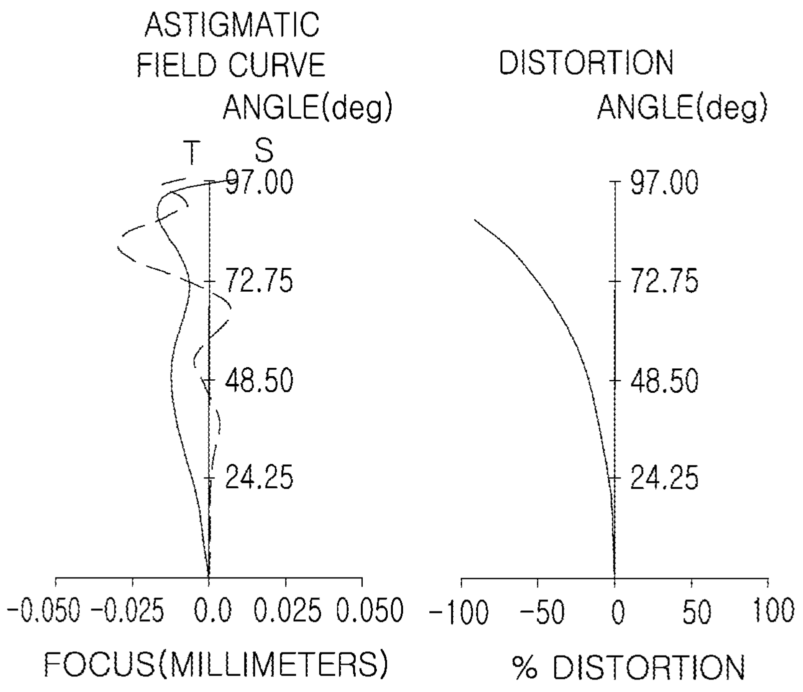
FIG. 12 illustrates aberration curves of the imaging lens system illustrated in FIG. 11.

FIG. 11 is a diagram of an imaging lens system according to a sixth embodiment, and FIG. 12 illustrates aberration curves of the imaging lens system illustrated in FIG. 11.

Referring to FIG. 11, an imaging lens system 600 may include a first lens 610, a second lens 620, a third lens 630, a fourth lens 640, a fifth lens 650, a sixth lens 660, and a seventh lens 670.

The first lens 610 may have a negative refractive power, and may have a convex object-side surface and a concave image-side surface. The second lens 620 may have a negative refractive power, and may have a concave object-side surface and a concave image-side surface. The third lens 630 may have a positive refractive power, and may have a concave object-side surface and a convex image-side surface. The fourth lens 640 may have a positive refractive power, and may have a convex object-side surface and a convex image-side surface. The fifth lens 650 may have a negative refractive power, and may have a convex object-side surface and a concave image-side surface. The sixth lens 660 may have a positive refractive power, and may have a convex object-side surface and a convex image-side surface. The seventh lens 670 may have a negative refractive power, and may have a concave object-side surface and a convex image-side surface.

The imaging lens system 600 may include a lens having an inflection point. For example, the inflection point may be formed on an object-side surface or an image-side surface of the second lens 620 and the fourth lens 640 to the seventh lens 670 in the imaging lens system 600 according to the sixth embodiment.

The imaging lens system 600 may further include a stop ST, a cover glass CG, a filter IF, and an imaging plane IP. The stop ST may be disposed between the third lens 630 and the fourth lens 640, and the cover glass CG and the filter IF may be disposed between the seventh lens 670 and the imaging plane IP. The imaging plane IP may be formed on a surface of an image sensor IS of a camera module or inside the image sensor IS.

Tables 11 and 12 below list lens properties and aspheric values of the imaging lens system according to the sixth embodiment.

TABLE 11

| Surface No. | Component | Radius of Curvature | Thickness/ Distance | Refractive Index | Abbe Number | Effective Radius |
|---|---|---|---|---|---|---|
| S1 | First | 14.8440 | 3.2500 | 1.776 | 49.6 | 10.357 |
| S2 | Lens | 4.1228 | 2.2105 | | | 4.012 |
| S3 | Second | −21.0170 | 0.7062 | 1.539 | 56.5 | 4.042 |
| S4 | Lens | 2.1006 | 2.1467 | | | 2.012 |
| S5 | Third | −61.5575 | 3.3700 | 1.670 | 20.7 | 1.998 |
| S6 | Lens | −4.5579 | 0.4853 | | | 1.611 |
| S7 | Stop | Infinity | 0.3626 | | | 1.176 |
| S8 | Fourth | 4.2735 | 1.3340 | 1.508 | 78.2 | 1.466 |
| S9 | Lens | −2.7418 | 0.1820 | | | 1.615 |
| S10 | Fifth | 19.1504 | 0.2800 | 1.674 | 20.4 | 1.599 |
| S11 | Lens | 2.2276 | 0.2091 | | | 1.808 |
| S12 | Sixth | 4.2725 | 2.5857 | 1.539 | 56.5 | 2.083 |
| S13 | Lens | −2.5107 | 0.1000 | | | 2.269 |
| S14 | Seventh | −2.6042 | 0.8516 | 1.657 | 21.5 | 2.247 |
| S15 | Lens | −3.1864 | 0.4646 | | | 2.632 |
| S16 | Cover | Infinity | 0.4000 | 1.519 | 64.2 | 2.806 |
| S17 | Glass | Infinity | 0.4646 | | | 2.842 |
| S18 | Filter | Infinity | 0.4000 | 1.519 | 64.2 | 2.905 |
| S19 | | Infinity | 0.1971 | | | 2.940 |
| S20 | Imaging Plane | Infinity | 0.0000 | | | 2.969 |

TABLE 12

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.62177 | 0.45432 | −0.10791 | 0.00265 | −0.03443 | −0.04685 |
| B | −0.35191 | 0.01055 | −0.00365 | 0.00473 | −0.00513 | −0.00863 |
| C | 0.07795 | −0.01473 | 0.00017 | 0.00037 | −0.00130 | −0.00242 |
| D | −0.00957 | −0.00227 | 0.00063 | 0.00001 | −0.00006 | 0.00004 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |
| Surface No. | S10 | S11 | S12 | S13 | S14 | S15 |
| k | 0.00000 | 0.00000 | 0.00000 | 0.00000 | 0.00000 | 0.00000 |
| A | −0.32665 | −0.45321 | −0.01023 | 0.30380 | 0.37846 | 0.76252 |
| B | 0.02160 | 0.01442 | −0.00929 | 0.11364 | −0.04610 | −0.15699 |
| C | 0.00125 | −0.00342 | 0.00157 | −0.01881 | −0.01808 | 0.07600 |
| D | 0.00040 | −0.00051 | −0.00198 | 0.00591 | 0.00402 | −0.00446 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 13:
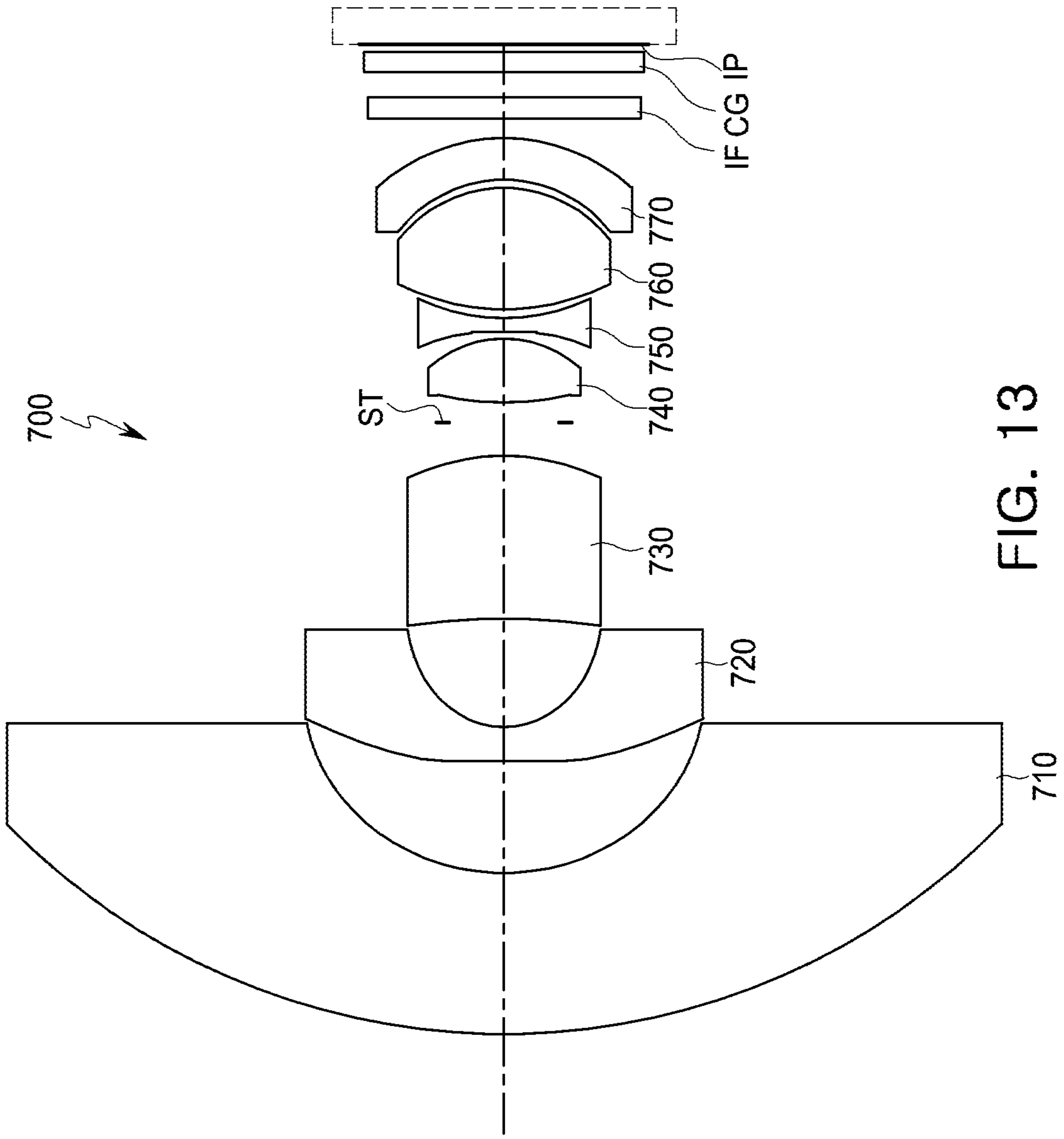
FIG. 13 is a diagram of an imaging lens system according to a seventh embodiment.
Figure 14:
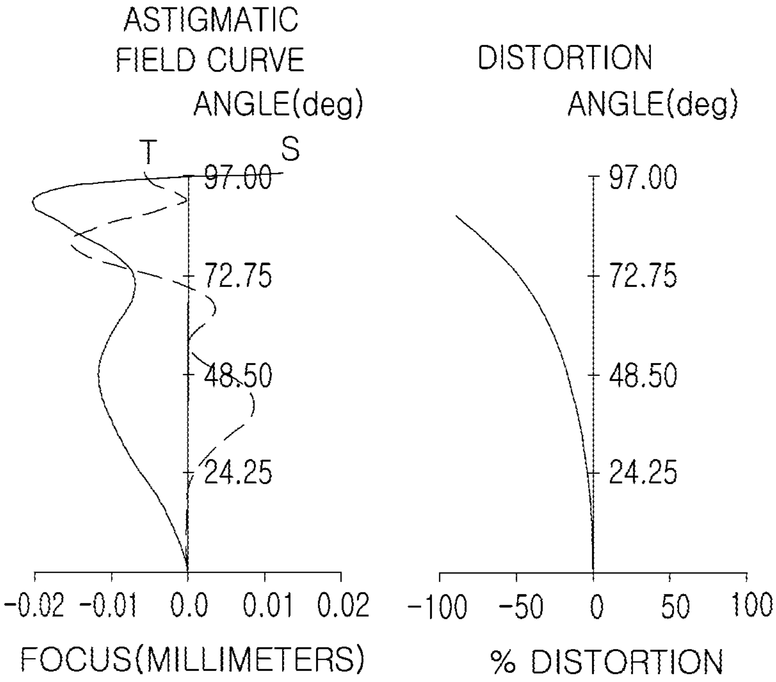
FIG. 14 illustrates aberration curves of the imaging lens system illustrated in FIG. 13.

FIG. 13 is a diagram of an imaging lens system according to a seventh embodiment, and FIG. 14 illustrates aberration curves of the imaging lens system illustrated in FIG. 13.

Referring to FIG. 13, an imaging lens system 700 includes a first lens 710, a second lens 720, a third lens 730, a fourth lens 740, a fifth lens 750, a sixth lens 760, and a seventh lens 770.

The first lens 710 may have a negative refractive power, and may have a convex object-side surface and a concave image-side surface. The second lens 720 may have a negative refractive power, and may have a concave object-side surface and a concave image-side surface. The third lens 730 may have a positive refractive power, and may have a concave object-side surface and a convex image-side surface. The fourth lens 740 may have a positive refractive power, and may have a convex object-side surface and a convex image-side surface. The fifth lens 750 may have a negative refractive power, and may have a convex object-side surface and a concave image-side surface. The sixth lens 760 may have a positive refractive power, and may have a convex object-side surface and a convex image-side surface. The seventh lens 770 may have a negative refractive power, and may have a concave object-side surface and a convex image-side surface.

The imaging lens system 700 may include a lens having an inflection point. For example, the inflection point may be formed on an object-side surface or an image-side surface of the second lens 720 and the fourth lens 740 to the seventh lens 770 in the imaging lens system 700 according to the seventh embodiment.

The imaging lens system 700 may further include a stop ST, a cover glass CG, a filter IF, and an imaging plane IP. The stop ST may be disposed between the third lens 730 and the fourth lens 740, and the cover glass CG and the filter IF may be disposed between the seventh lens 770 and the imaging plane IP. The imaging plane IP may be formed on a surface of an image sensor IS of a camera module or inside the image sensor IS.

Tables 13 and 14 below list lens properties and aspherical values of the imaging lens system according to the seventh embodiment.

TABLE 13

| Surface No | Component | Radius of Curvature | Thickness/ Distance | Refractive Index | Abbe Number | Effective Radius |
|---|---|---|---|---|---|---|
| S1 | First | 14.8453 | 3.2000 | 1.776 | 49.6 | 10.392 |
| S2 | Lens | 4.2722 | 2.2960 | | | 4.135 |
| S3 | Second | −17.3247 | 0.7289 | 1.539 | 56.5 | 4.168 |
| S4 | Lens | 2.1043 | 2.1180 | | | 2.016 |
| S5 | Third | −55.4554 | 3.3700 | 1.763 | 25.2 | 2.006 |
| S6 | Lens | −4.5410 | 0.6778 | | | 1.703 |
| S7 | Stop | Infinity | 0.3646 | | | 1.138 |
| S8 | Fourth | 4.8980 | 1.3182 | 1.506 | 79.0 | 1.412 |
| S9 | Lens | −2.6559 | 0.1247 | | | 1.581 |
| S10 | Fifth | 13.9983 | 0.2800 | 1.672 | 20.0 | 1.583 |
| S11 | Lens | 2.2304 | 0.1521 | | | 1.793 |
| S12 | Sixth | 4.5298 | 2.5784 | 1.539 | 56.5 | 1.918 |
| S13 | Lens | −2.4432 | 0.1000 | | | 2.219 |
| S14 | Seventh | −2.4634 | 0.8623 | 1.657 | 21.5 | 2.202 |
| S15 | Lens | −3.0451 | 0.4646 | | | 2.647 |
| S16 | Cover | Infinity | 0.4000 | 1.519 | 64.2 | 2.833 |
| S17 | Glass | Infinity | 0.4646 | | | 2.865 |
| S18 | Filter | Infinity | 0.4000 | 1.519 | 64.2 | 2.923 |
| S19 | | Infinity | 0.1000 | | | 2.956 |
| S20 | Imaging Plane | Infinity | 0.0000 | | | 2.970 |

TABLE 14

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.68352 | 0.49425 | −0.09913 | 0.00134 | −0.04307 | −0.03830 |
| B | −0.35567 | 0.01559 | −0.00342 | 0.00119 | −0.00922 | −0.00968 |
| C | 0.07853 | −0.01855 | −0.00051 | 0.00013 | −0.00155 | −0.00210 |
| D | −0.00963 | −0.00303 | 0.00042 | 0.00000 | 0.00000 | 0.00034 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |
| **Surface No.** | **S10** | **S11** | **S12** | **S13** | **S14** | **S15** |
| k | 0.00000 | 0.00000 | 0.00000 | 0.00000 | 0.00000 | 0.00000 |
| A | −0.33430 | −0.43897 | −0.00190 | 0.29620 | 0.36152 | 0.62369 |
| B | 0.02877 | 0.01696 | −0.00867 | 0.10915 | −0.03864 | −0.15527 |
| C | 0.00029 | −0.00472 | 0.00271 | −0.01981 | −0.02121 | 0.03657 |
| D | 0.00049 | −0.00050 | −0.00090 | 0.01569 | 0.00790 | 0.00139 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 15:
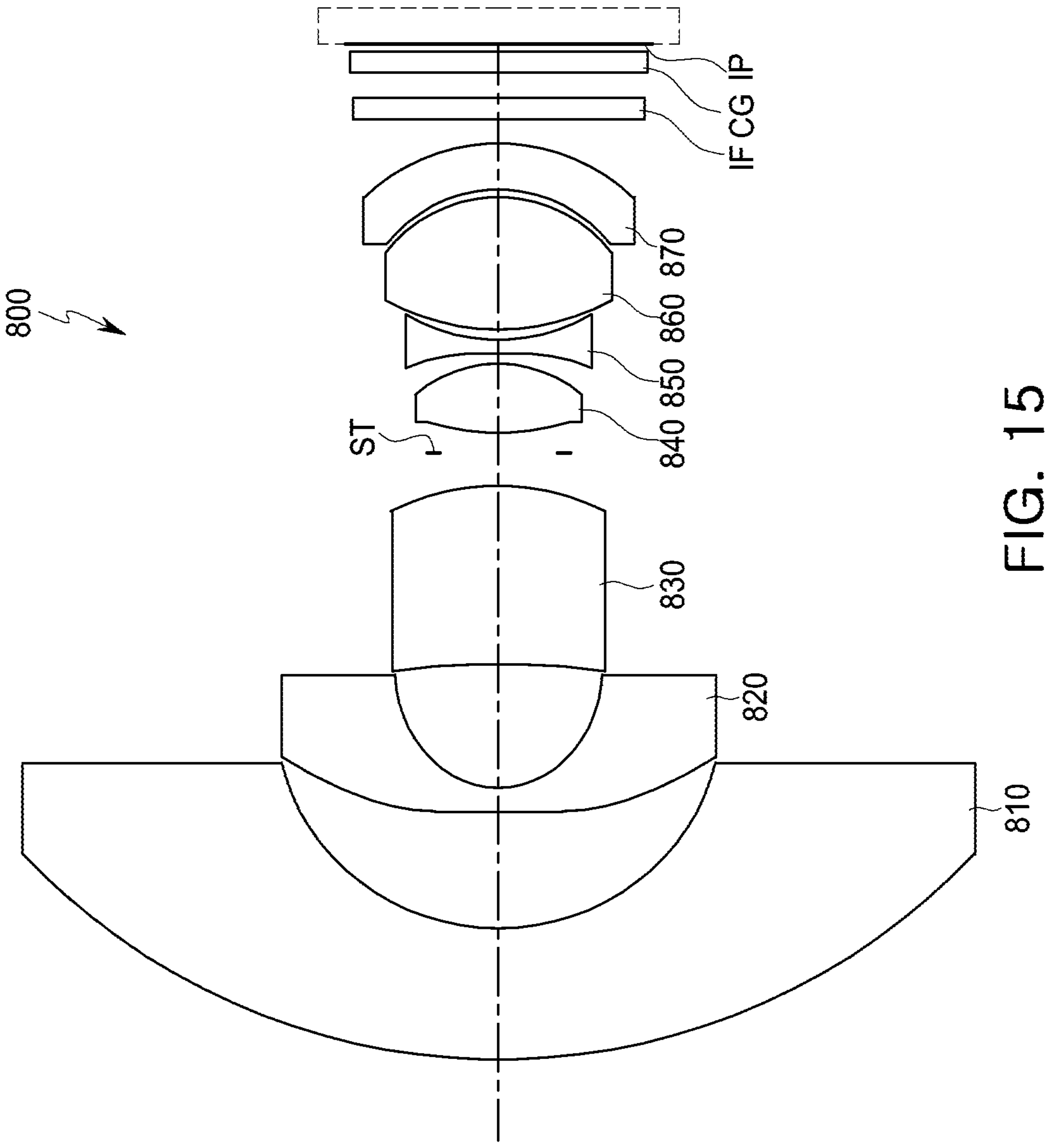
FIG. 15 is a diagram of an imaging lens system according to an eighth embodiment.
Figure 16:
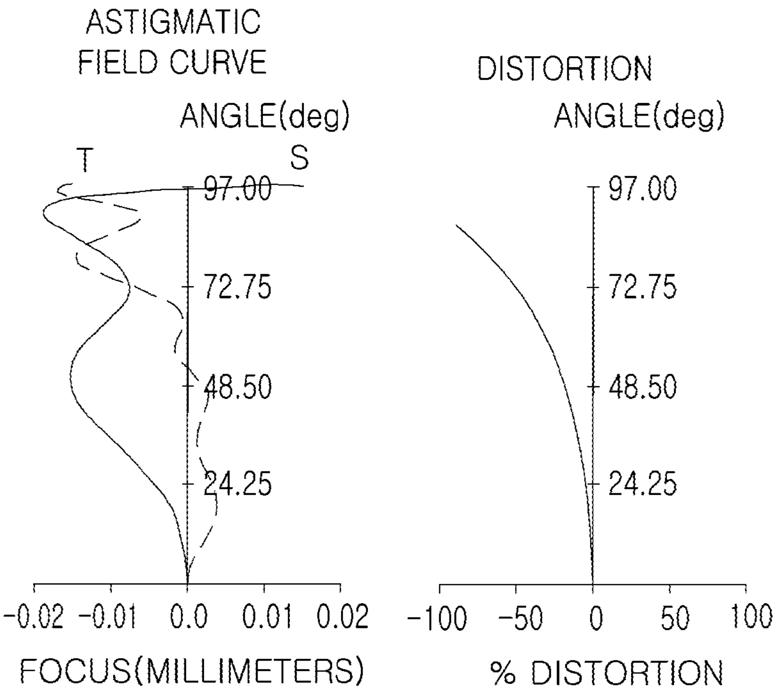
FIG. 16 illustrates aberration curves of the imaging lens system illustrated in FIG. 15.

FIG. 15 is a diagram of an imaging lens system according to an eighth embodiment, and FIG. 16 illustrates aberration curves of the imaging lens system illustrated in FIG. 15.

Referring to FIG. 15, an imaging lens system 800 includes a first lens 810, a second lens 820, a third lens 830, a fourth lens 840, a fifth lens 850, a sixth lens 860, and a seventh lens 870.

The first lens 810 may have a negative refractive power, and may have a convex object-side surface and a concave image-side surface. The second lens 820 may have a negative refractive power, and may have a concave object-side surface and a concave image-side surface. The third lens 830 may have a positive refractive power, and may have a concave object-side surface and a convex image-side surface. The fourth lens 840 may have a positive refractive power, and may have a convex object-side surface and a convex image-side surface. The fifth lens 850 may have a negative refractive power, and may have a convex object-side surface and a concave image-side surface. The sixth lens 860 may have a positive refractive power, and may have a convex object-side surface and a convex image-side surface. The seventh lens 870 may have a negative refractive power, and may have a concave object-side surface and a convex image-side surface.

The imaging lens system 800 may include a lens having an inflection point. For example, the inflection point may be formed on an object-side surface or an image-side surface of the second lens 820 and the fourth lens 840 to the seventh lens 870 in the imaging lens system 800 according to the eighth embodiment.

The imaging lens system 800 may further include a stop ST, a cover glass CG, a filter IF, and an imaging plane IP. The stop ST may be disposed between the third lens 830 and the fourth lens 840, and the cover glass CG and the filter IF may be disposed between the seventh lens 870 and the imaging plane IP. The imaging plane IP may be formed on a surface of an image sensor IS of a camera module or inside the image sensor IS.

Tables 15 and 16 below list lens properties and aspherical values of the imaging lens system according to the eighth embodiment.

TABLE 15

| Surface No. | Component | Radius of Curvature | Thickness/ Distance | Refractive Index | Abbe Number | Effective Radius |
|---|---|---|---|---|---|---|
| S1 | First | 13.0000 | 2.4240 | 1.776 | 49.6 | 9.403 |
| S2 | Lens | 4.3504 | 2.2359 | | | 4.214 |
| S3 | Second | −16.8740 | 0.4394 | 1.539 | 56.5 | 4.264 |
| S4 | Lens | 2.1992 | 2.3823 | | | 2.110 |
| S5 | Third | −37.4395 | 3.3700 | 1.670 | 20.7 | 2.106 |
| S6 | Lens | −4.7088 | 0.6562 | | | 1.680 |
| S7 | Stop | Infinity | 0.3760 | | | 1.153 |
| S8 | Fourth | 4.1646 | 1.3182 | 1.506 | 79.0 | 1.486 |
| S9 | Lens | −2.8263 | 0.1940 | | | 1.634 |
| S10 | Fifth | 13.0303 | 0.2800 | 1.672 | 20.0 | 1.638 |
| S11 | Lens | 2.2241 | 0.1625 | | | 1.825 |
| S12 | Sixth | 4.4567 | 2.5784 | 1.539 | 56.5 | 1.961 |
| S13 | Lens | −2.4650 | 0.1000 | | | 2.245 |
| S14 | Seventh | −2.5302 | 0.8623 | 1.657 | 21.5 | 2.228 |
| S15 | Lens | −3.0928 | 0.4646 | | | 2.658 |
| S16 | Cover | Infinity | 0.4000 | 1.519 | 64.2 | 2.833 |
| S17 | Glass | Infinity | 0.4646 | | | 2.864 |
| S18 | Filter | Infinity | 0.4000 | 1.519 | 64.2 | 2.920 |
| S19 | | Infinity | 0.1000 | | | 2.952 |
| S20 | Imaging Plane | Infinity | 0.0000 | | | 2.971 |

TABLE 16

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.87299 | 0.56008 | −0.11111 | 0.00449 | −0.04045 | −0.03914 |
| B | −0.42403 | 0.03387 | −0.00300 | 0.00194 | −0.00772 | −0.00651 |
| C | 0.10004 | −0.01459 | −0.00036 | 0.00023 | −0.00138 | −0.00220 |
| D | −0.01298 | −0.00476 | 0.00058 | 0.00000 | 0.00000 | 0.00020 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |
| Surface No. | S10 | S11 | S12 | S13 | S14 | S15 |
| k | 0.00000 | 0.00000 | 0.00000 | 0.00000 | 0.00000 | 0.00000 |
| A | −0.33857 | −0.44543 | −0.00193 | 0.27453 | 0.36342 | 0.63232 |
| B | 0.03141 | 0.01700 | −0.00755 | 0.10306 | −0.03940 | −0.15467 |
| C | 0.00055 | −0.00466 | 0.00248 | −0.02282 | −0.02287 | 0.03375 |
| D | 0.00034 | −0.00065 | −0.00070 | 0.01125 | 0.00719 | 0.00194 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 17:
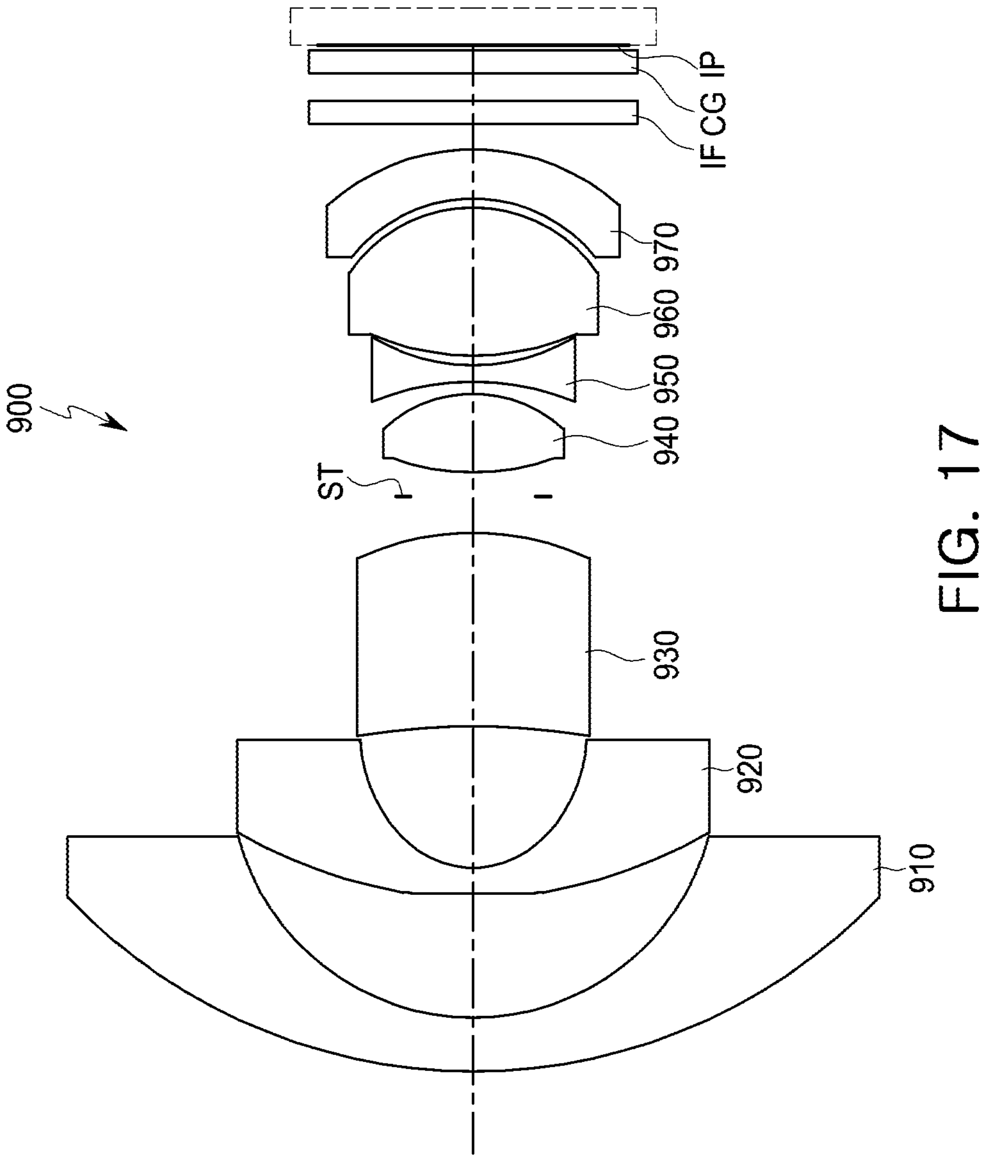
FIG. 17 is a diagram of an imaging lens system according to a ninth embodiment.
Figure 18:
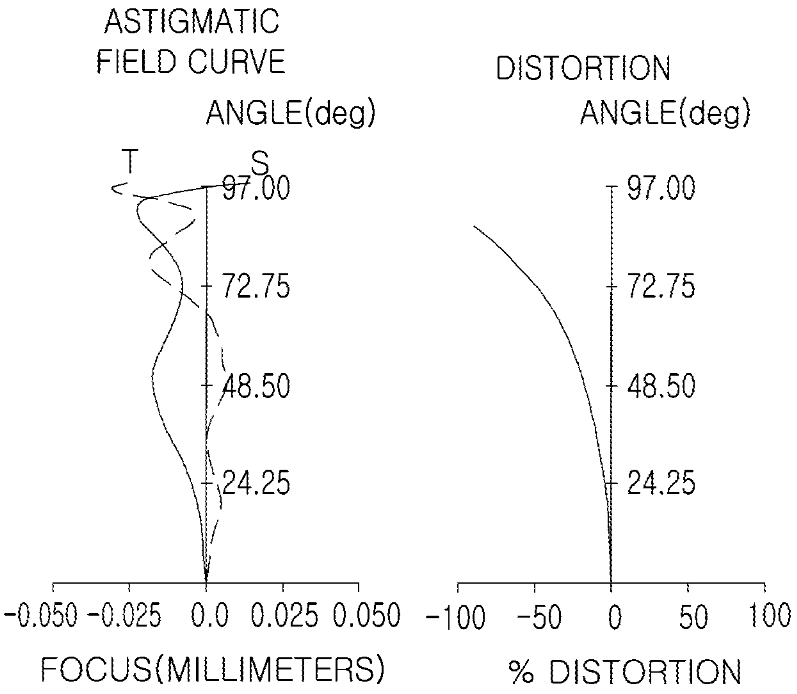
FIG. 18 illustrates aberration curves of the imaging lens system illustrated in FIG. 17.

FIG. 17 is a diagram of an imaging lens system according to a ninth embodiment, and FIG. 18 illustrates aberration curves of the imaging lens system illustrated in FIG. 17.

Referring to FIG. 17, an imaging lens system 900 includes a first lens 910, a second lens 920, a third lens 930, a fourth lens 940, a fifth lens 950, a sixth lens 960, and a seventh lens 970.

The first lens 910 may have a negative refractive power, and may have a convex object-side surface and a concave image-side surface. The second lens 920 may have a negative refractive power, and may have a concave object-side surface and a concave image-side surface. The third lens 930 may have a positive refractive power, and may have a concave object-side surface and a convex image-side surface. The fourth lens 940 may have a positive refractive power, and may have a convex object-side surface and a convex image-side surface. The fifth lens 950 may have a negative refractive power, and may have a convex object-side surface and a concave image-side surface. The sixth lens 960 may have a positive refractive power, and may have a convex object-side surface and a convex image-side surface. The seventh lens 970 may have a negative refractive power, and may have a concave object-side surface and a convex image-side surface.

The imaging lens system 900 may include a lens having an inflection point. For example, the inflection point may be formed on an object-side surface or an image-side surface of the second lens 920 and the fourth lens 940 to the seventh lens 970 in the imaging lens system 900 according to the ninth embodiment.

The imaging lens system 900 may further include a stop ST, a cover glass CG, a filter IF, and an imaging plane IP. The stop ST may be disposed between the third lens 930 and the fourth lens 940, and the cover glass CG and the filter IF may be disposed between the seventh lens 970 and the imaging plane IP. The imaging plane IP may be formed on a surface of an image sensor IS of a camera module or inside the image sensor IS.

Tables 17 and 18 below list lens properties and aspherical values of the imaging lens system according to ninth embodiment.

TABLE 17

| Surface No | Component | Radius of Curvature | Thickness/ Distance | Refractive Index | Abbe Number | Effective Radius |
|---|---|---|---|---|---|---|
| S1 | First | 10.0000 | 0.8106 | 1.776 | 49.6 | 7.184 |
| S2 | Lens | 4.2957 | 2.1980 | | | 4.159 |
| S3 | Second | −15.7581 | 0.4048 | 1.539 | 56.5 | 4.201 |
| S4 | Lens | 2.1815 | 2.4058 | | | 2.091 |
| S5 | Third | −35.7151 | 3.3700 | 1.670 | 20.7 | 2.076 |
| S6 | Lens | −4.5250 | 0.6129 | | | 1.666 |
| S7 | Stop | Infinity | 0.4046 | | | 1.157 |
| S8 | Fourth | 4.2384 | 1.3182 | 1.506 | 79.0 | 1.510 |
| S9 | Lens | −2.7512 | 0.1974 | | | 1.651 |
| S10 | Fifth | 15.7032 | 0.2800 | 1.672 | 20.0 | 1.669 |
| S11 | Lens | 2.2198 | 0.1567 | | | 1.851 |
| S12 | Sixth | 4.6591 | 2.5784 | 1.539 | 56.5 | 1.876 |
| S13 | Lens | −2.4424 | 0.1000 | | | 2.230 |
| S14 | Seventh | −2.5691 | 0.8623 | 1.657 | 21.5 | 2.208 |
| S15 | Lens | −3.0740 | 0.4645 | | | 2.642 |
| S16 | Cover | Infinity | 0.4000 | 1.519 | 64.2 | 2.826 |
| S17 | Glass | Infinity | 0.4645 | | | 2.860 |
| S18 | Filter | Infinity | 0.4000 | 1.519 | 64.2 | 2.920 |
| S19 | | Infinity | 0.1000 | | | 2.953 |
| S20 | Imaging Plane | Infinity | 0.0000 | | | 2.972 |

TABLE 18

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.87276 | 0.56305 | −0.11196 | 0.00547 | −0.04149 | −0.03828 |
| B | −0.43042 | 0.03677 | −0.00319 | 0.00126 | −0.00850 | −0.00623 |
| C | 0.10122 | −0.01392 | −0.00045 | 0.00016 | −0.00150 | −0.00275 |
| D | −0.01270 | −0.00515 | 0.00065 | 0.00000 | 0.00000 | 0.00029 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |
| Surface No. | S10 | S11 | S12 | S13 | S14 | S15 |
| k | 0.00000 | 0.00000 | 0.00000 | 0.00000 | 0.00000 | 0.00000 |
| A | −0.33738 | −0.44322 | −0.00038 | 0.27516 | 0.33470 | 0.63283 |
| B | 0.03307 | 0.01629 | −0.01174 | 0.10367 | −0.04024 | −0.15229 |
| C | −0.00009 | −0.00493 | 0.00225 | −0.02682 | −0.02592 | 0.02567 |
| D | 0.00046 | −0.00065 | −0.00086 | 0.01252 | 0.00567 | 0.00181 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Figure 19:
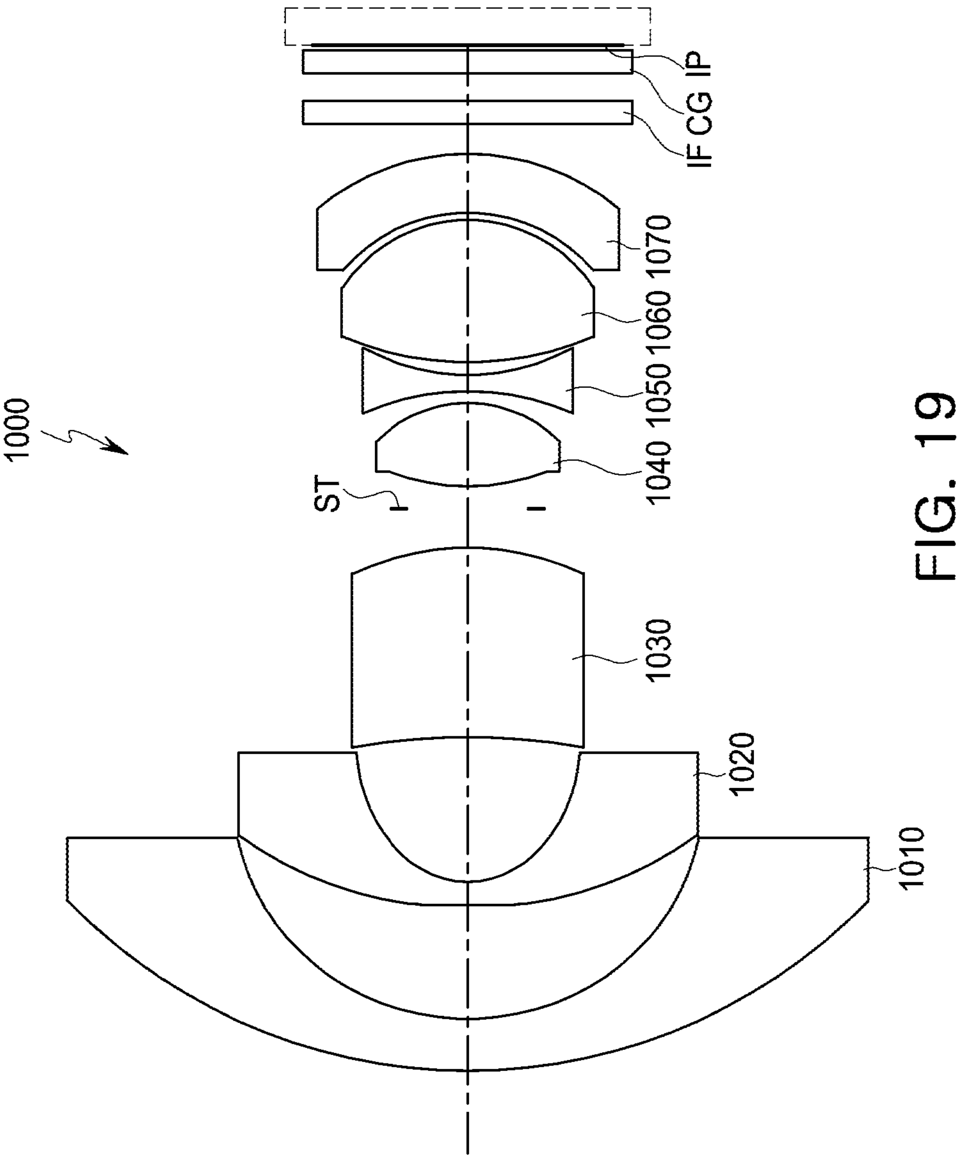
FIG. 19 is a diagram of an imaging lens system according to a tenth embodiment.
Figure 20:
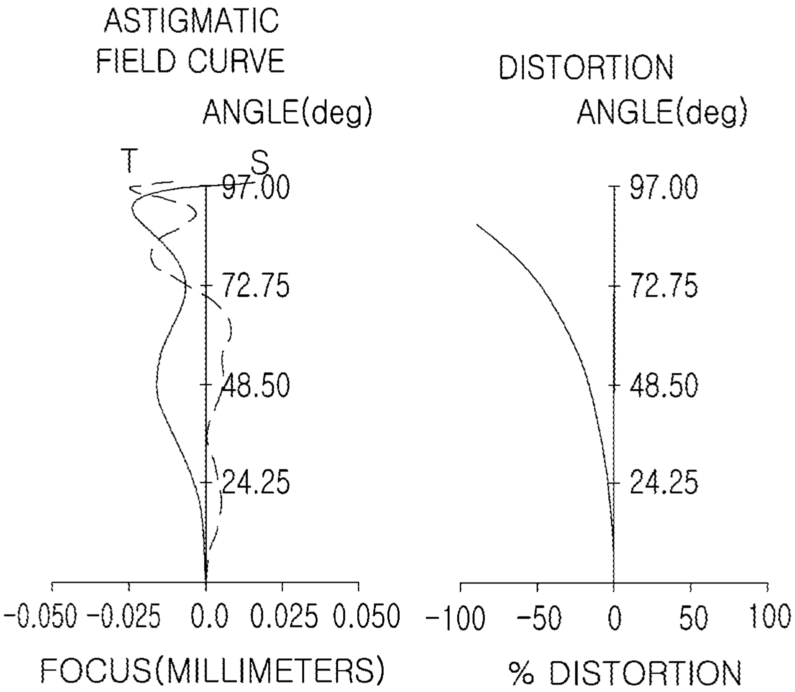
FIG. 20 illustrates aberration curves of the imaging lens system illustrated in FIG. 19.

FIG. 19 is a diagram of an imaging lens system according to a tenth embodiment, and FIG. 20 illustrates aberration curves of the imaging lens system illustrated in FIG. 19.

Referring to FIG. 19, an imaging lens system 1000 includes a first lens 1010, a second lens 1020, a third lens 1030, a fourth lens 1040, a fifth lens 1050, a sixth lens 1060, and a seventh lens 1070.

The first lens 1010 may have a negative refractive power, and may have a convex object-side surface and a concave image-side surface. The second lens 1020 may have a negative refractive power, and may have a concave object-side surface and a concave image-side surface. The third lens 1030 may have a positive refractive power, and may have a concave object-side surface and a convex image-side surface. The fourth lens 1040 may have a positive refractive power, and may have a convex object-side surface and a convex image-side surface. The fifth lens 1050 may have a negative refractive power, and may have a convex object-side surface and a concave image-side surface. The sixth lens 1060 may have a positive refractive power, and may have a convex object-side surface and a convex image-side surface. The seventh lens 1070 may have a negative refractive power, and may have a concave object-side surface and a convex image-side surface.

The imaging lens system 1000 may include a lens having an inflection point. For example, the inflection point may be formed on an object-side surface or an image-side surface of the second lens 1020 and the fourth lens 1040 to the seventh lens 1070 in the imaging lens system 1000 according to the tenth embodiment.

The imaging lens system 1000 may further include a stop ST, a cover glass CG, a filter IF, and an imaging plane IP. The stop ST may be disposed between the third lens 1030 and the fourth lens 1040, and the cover glass CG and the filter IF may be disposed between the seventh lens 1070 and the imaging plane IP. The imaging plane IP may be formed on a surface of an image sensor IS of a camera module or inside the image sensor IS.

Tables 19 and 20 below list lens properties and aspherical values of the imaging lens system according to the tenth embodiment.

TABLE 19

| Surface No. | Component | Radius of Curvature | Thickness/ Distance | Refractive Index | Abbe Number | Effective Radius |
|---|---|---|---|---|---|---|
| S1 | First | 10.0000 | 0.8106 | 1.776 | 49.6 | 6.974 |
| S2 | Lens | 4.1736 | 1.9500 | | | 4.019 |
| S3 | Second | −19.7794 | 0.3540 | 1.539 | 56.5 | 4.018 |
| S4 | Lens | 2.1456 | 2.4140 | | | 2.058 |
| S5 | Third | −25.0094 | 3.2252 | 1.668 | 20.4 | 2.056 |
| S6 | Lens | −4.4512 | 0.6089 | | | 1.650 |
| S7 | Stop | Infinity | 0.4016 | | | 1.138 |
| S8 | Fourth | 4.1642 | 1.3556 | 1.506 | 79.0 | 1.479 |
| S9 | Lens | −2.6103 | 0.1961 | | | 1.646 |
| S10 | Fifth | 21.8825 | 0.2619 | 1.668 | 20.4 | 1.670 |
| S11 | Lens | 2.2364 | 0.1563 | | | 1.872 |
| S12 | Sixth | 4.6635 | 2.4716 | 1.539 | 56.5 | 1.940 |
| S13 | Lens | −2.4636 | 0.1000 | | | 2.245 |
| S14 | Seventh | −2.6438 | 0.9743 | 1.657 | 21.5 | 2.198 |
| S15 | Lens | −3.0689 | 0.4645 | | | 2.662 |
| S16 | Cover | Infinity | 0.4000 | 1.519 | 64.2 | 2.832 |
| S17 | Glass | Infinity | 0.4645 | | | 2.864 |
| S18 | Filter | Infinity | 0.4000 | 1.519 | 64.2 | 2.921 |
| S19 | | Infinity | 0.1000 | | | 2.953 |
| S20 | Imaging Plane | Infinity | 0.0000 | | | 2.971 |

TABLE 20

| Surface No. | S3 | S4 | S5 | S6 | S8 | S9 |
|---|---|---|---|---|---|---|
| k | 0.00000 | 0.00000 | 0.00000 | 0.00000 | 0.00000 | 0.00000 |
| A | 1.82739 | 0.65665 | −0.12325 | 0.00582 | −0.05196 | −0.03742 |
| B | −0.40475 | 0.04207 | −0.00353 | 0.00259 | −0.00999 | −0.00768 |
| C | 0.09507 | −0.01814 | −0.00015 | 0.00032 | −0.00174 | −0.00353 |
| D | −0.01078 | −0.00603 | 0.00064 | 0.00000 | 0.00001 | 0.00063 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |
| Surface No. | S10 | S11 | S12 | S13 | S14 | S15 |
| k | 0.00000 | 0.00000 | 0.00000 | 0.00000 | 0.00000 | 0.00000 |
| A | −0.40206 | −0.51588 | 0.00512 | 0.22461 | 0.31101 | 0.72604 |
| B | 0.04859 | 0.01895 | −0.01522 | 0.08361 | −0.06262 | −0.17036 |
| C | −0.00060 | −0.00755 | 0.00294 | −0.02611 | −0.02083 | 0.04028 |
| D | 0.00081 | −0.00095 | −0.00109 | 0.01042 | 0.00451 | −0.00009 |
| E | 0 | 0 | 0 | 0 | 0 | 0 |
| F | 0 | 0 | 0 | 0 | 0 | 0 |
| G | 0 | 0 | 0 | 0 | 0 | 0 |
| H | 0 | 0 | 0 | 0 | 0 | 0 |
| J | 0 | 0 | 0 | 0 | 0 | 0 |

Tables 21 and 22 below list optical property values and conditional expression values of the imaging lens systems according to the first to tenth embodiments.

TABLE 21

| Optical Property | First Embodiment | Second Embodiment | Third Embodiment | Fourth Embodiment | Fifth Embodiment |
|---|---|---|---|---|---|
| f1 | −8.7772 | −8.6946 | −9.1119 | −9.1872 | −9.0779 |
| f2 | −3.2139 | −3.2334 | −3.4279 | −3.3959 | −3.4707 |
| f3 | 6.8628 | 6.4763 | 6.9011 | 7.3313 | 7.2175 |
| f4 | 3.0477 | 3.3609 | 3.4676 | 3.5011 | 3.5750 |
| f5 | −3.1139 | −3.6220 | −3.7883 | −3.8848 | −3.9771 |
| f6 | 3.0603 | 3.1070 | 3.1890 | 3.2232 | 3.3136 |
| f7 | −45.9309 | −48.0197 | −67.6013 | −48.0322 | −43.5873 |
| TTL | 18.0000 | 18.9242 | 19.0000 | 19.0000 | 19.0000 |
| BFL | 2.2617 | 2.1980 | 2.0413 | 1.9180 | 1.8291 |
| f | 1.2640 | 1.2820 | 1.2580 | 1.2600 | 1.2780 |
| f-number | 1.8400 | 1.8400 | 1.8400 | 1.8400 | 1.8400 |
| ImgHT | 2.8770 | 2.8790 | 2.8790 | 2.8790 | 2.8790 |

TABLE 21-continued

| HFOV | 190.0000 | 190.0000 | 190.0000 | 190.0000 | 190.0000 |
|---|---|---|---|---|---|
| Optical Property | Sixth Embodiment | Seventh Embodiment | Eight Embodiment | Ninth Embodiment | Tenth Embodiment |
| f1 | −8.4770 | −8.9057 | −9.5991 | −10.3443 | −9.8260 |
| f2 | −3.5069 | −3.4374 | −3.5821 | −3.5286 | −3.5723 |
| f3 | 7.1799 | 6.3002 | 7.7238 | 7.4155 | 7.6232 |
| f4 | 3.5120 | 3.6164 | 3.5535 | 3.5211 | 3.4005 |
| f5 | −3.7641 | −3.9841 | −4.0305 | −3.8774 | −3.7472 |
| f6 | 3.3871 | 3.3838 | 3.3875 | 3.4071 | 3.4053 |
| f7 | −51.6374 | −47.6046 | −53.9694 | −73.7539 | −318.8694 |
| TTL | 20.0000 | 20.0000 | 19.2082 | 17.5288 | 17.1092 |
| BFL | 1.9262 | 1.8291 | 1.8291 | 1.8291 | 1.8291 |
| f | 1.3080 | 1.3010 | 1.2960 | 1.2830 | 1.2820 |
| f-number | 1.8400 | 1.8400 | 1.8400 | 1.8400 | 1.8500 |
| ImgHT | 2.8810 | 2.8790 | 2.8790 | 2.8790 | 2.8790 |
| HFOV | 190.0000 | 190.0000 | 190.0000 | 190.0000 | 190.0000 |

TABLE 22

| Conditional Expression | First Embodiment | Second Embodiment | Third Embodiment | Fourth Embodiment | Fifth Embodiment |
|---|---|---|---|---|---|
| f1/f | −6.9440 | −6.7821 | −7.2432 | −7.2914 | −7.1032 |
| f1/f4 | −2.8799 | −2.5870 | −2.6277 | −2.6241 | −2.5393 |
| f5/f6 | −1.0175 | −1.1658 | −1.1879 | −1.2052 | −1.2002 |
| \|V6 − V5\| | 32.9814 | 33.6874 | 33.6874 | 33.6874 | 36.0731 |
| L1ER1/HFOV | 0.0440 | 0.0499 | 0.0505 | 0.0465 | 0.0471 |
| ImgHT/TTL | 0.1598 | 0.1521 | 0.1515 | 0.1515 | 0.1515 |
| HFOV/TTL | 10.5556 | 10.0400 | 10.0000 | 10.0000 | 10.0000 |
| D12/D23 | 1.4441 | 1.3467 | 1.1226 | 1.1226 | 1.1082 |
| (R8 + R11)/T5 | 4.7226 | 5.3899 | 6.1439 | 4.6571 | 4.9141 |
| \|R3/T2\| | 35.7740 | 27.7840 | 40.6023 | 21.3608 | 25.9019 |
| \|(R9 + R10)/T5\| | 128.0117 | 60.2608 | 70.5214 | 54.5944 | 49.9733 |
| (R11 + R12)/T6 | 1.4330 | 1.1187 | 0.8683 | 0.6619 | 0.6585 |
| Conditional Expression | Sixth Embodiment | Seventh Embodiment | Eighth Embodiment | Ninth Embodiment | Tenth Embodimentt |
| f1/f | −6.4809 | −6.8453 | −7.4067 | −8.0626 | −7.6645 |
| f1/f4 | −2.4137 | −2.4626 | −2.7013 | −2.9378 | −2.8896 |
| f5/f6 | −1.1113 | −1.1774 | −1.1898 | −1.1380 | −1.1004 |
| \|V6 − V5\| | 36.0731 | 36.4476 | 36.4476 | 36.4476 | 36.0959 |
| L1ER1/HFOV | 0.0545 | 0.0547 | 0.0495 | 0.0378 | 0.0367 |

TABLE 22-continued

| | | | | | |
|---|---|---|---|---|---|
| ImgHT/TTL | 0.1441 | 0.1440 | 0.1499 | 0.1642 | 0.1683 |
| HFOV/TTL | 9.5000 | 9.5000 | 9.8916 | 10.8393 | 11.1052 |
| D12/D23 | 1.0297 | 1.0840 | 0.9385 | 0.9136 | 0.8078 |
| (R8 + R11)/T5 | 5.4667 | 6.6925 | 5.8228 | 6.8140 | 7.8381 |
| \|R3/T2\| | 29.7609 | 23.7678 | 38.4000 | 38.9270 | 55.8813 |
| \|(R9 + R10)/T5\| | 76.3499 | 57.9599 | 54.4799 | 64.0110 | 92.0747 |
| (R11 + R12)/T6 | 0.6813 | 0.8092 | 0.7725 | 0.8598 | 0.8901 |

As can been from Table 21 above, the embodiments of an imaging lens system described above provide an imaging lens system having a low f-number and a wide field of view.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:

a first lens having negative refractive power, a second lens having negative refractive power, a third lens having positive refractive power, a fourth lens having positive refractive power, a fifth lens having negative refractive power, a sixth lens having positive refractive power, and a seventh lens having negative refractive power and a convex image-side surface in a paraxial region thereof, sequentially disposed in ascending numerical order along an optical axis of the imaging lens system from an object side of the imaging lens system toward an imaging plane of the imaging lens system, wherein the second lens has a concave object-side surface in a paraxial region thereof, wherein an absolute value of a radius of curvature of an image-side surface of the third lens is less than an absolute value of a radius of curvature of an object-side surface of the second lens, wherein an absolute value of a radius of curvature of an image-side surface of the third lens is less than an absolute value of a radius of curvature of an image-side surface of the fifth lens, and wherein the imaging lens system satisfies the following conditional expressions:

$$f5/f6<-1.0,$$

$$f1/f4<-2.4,$$

$$190°\leq HFOV, \text{ and}$$

$$20<|R3/T2|<60,$$

where f is a focal length of the imaging lens system, f1 is a focal length of the first lens, f4 is a focal length of the fourth lens, f5 is a focal length of the fifth lens, HFOV is a horizontal field of view of the imaging lens system, R3 is a radius of curvature of an object-side surface of the second lens at the optical axis, and T2 is a thickness of the second lens along the optical axis.

2. The imaging lens system of claim 1, wherein the third lens has a convex object-side surface in a paraxial region thereof.

3. The imaging lens system of claim 1, wherein the third lens has a convex image-side surface in a paraxial region thereof.

4. The imaging lens system of claim 1, wherein the fifth lens has a concave object-side surface in a paraxial region thereof.

5. The imaging lens system of claim 1, wherein the seventh lens has a concave object-side surface in a paraxial region thereof.

6. The imaging lens system of claim 1, wherein the imaging lens system further satisfies the following conditional expression:

$$0.03\text{ mm/°}<L1ER1/HFOV<0.06\text{ mm/°},$$

where L1ER1 is an effective radius of an object-side surface of the first lens.

7. The imaging lens system of claim 1, wherein the imaging lens system further satisfies the following conditional expression:

$$0.10<ImgHT/TTL<0.20,$$

where ImgHT is a maximum effective image height on the imaging plane, and TTL is a distance along the optical axis from an object-side surface of the first lens to the imaging plane.

8. The imaging lens system of claim 1, wherein the imaging lens system further satisfies the following conditional expression:

$$0.80<D12/D23<1.60,$$

where D12 is a distance along the optical axis from an image-side surface of the first lens to the object-side surface of the second lens, and D23 is a distance along the optical axis from an image-side surface of the second lens to an object-side surface of the third lens.

9. The imaging lens system of claim 1, wherein the imaging lens system further satisfies the following conditional expression:

$$4.0<(R8+R11)/T5<8.0,$$

where R8 is a radius of curvature of an image-side surface of the fourth lens at the optical axis, R11 is a radius of curvature of an object-side surface of the sixth lens at the optical axis, and T5 is a thickness of the fifth lens along the optical axis.

10. An imaging lens system, comprising:

a first lens having negative refractive power, a second lens having negative refractive power, a third lens having positive refractive power, a fourth lens having positive refractive power, a fifth lens having negative refractive power and a convex object-side surface in a paraxial region thereof, a sixth lens having positive refractive power, and a seventh lens having negative refractive power, sequentially disposed in ascending numerical order along an optical axis of the imaging lens system from an object side of the imaging lens system toward an imaging plane of the imaging lens system, wherein an absolute value of a radius of curvature of an image-side surface of the third lens is less than an absolute value of a radius of curvature of an object-side surface of the second lens, wherein an absolute value of a radius of curvature of an image-side surface of the third lens is less than an absolute value of a radius of curvature of an image-side surface of the fifth lens, and wherein the imaging lens system satisfies the following conditional expressions:

$$190° \leq HFOV,$$

$$8.0°/mm < HFOV/TTL < 12.0°/mm, \text{ and}$$

$$20 < |R3/T2| < 60,$$

where HFOV is a horizontal field of view of the imaging lens system, TTL is a distance along the optical axis from an object-side surface of the first lens to the imaging plane, R3 is a radius of curvature of an object-side surface of the second lens at the optical axis, and T2 is a thickness of the second lens along the optical axis.

11. The imaging lens system of claim 10, wherein the second lens has a concave object-side surface in a paraxial region thereof.

12. The imaging lens system of claim 10, wherein the seventh lens has a convex image-side surface in a paraxial region thereof.

13. The imaging lens system of claim 10, wherein the imaging lens system further satisfies the following conditional expression:

$$46 < |(R9+R10)/T5| < 136,$$

where R9 is a radius of curvature of an object-side surface of the fifth lens at the optical axis, R10 is a radius of curvature of an image-side surface of the fifth lens at the optical axis, and T5 is a thickness of the fifth lens along the optical axis.

14. The imaging lens system of claim 10, wherein the imaging lens system further satisfies the following conditional expression:

$$0.6 < |(R11+R12)/T6| < 1.6,$$

where R11 is a radius of curvature of an object-side surface of the sixth lens at the optical axis, R12 is a radius of curvature of an image-side surface of the sixth lens at the optical axis, and T6 is a thickness of the sixth lens along the optical axis.

* * * * *